US012718538B2

(12) United States Patent
Yang et al.

(10) Patent No.: US 12,718,538 B2
(45) Date of Patent: Aug. 25, 2026

(54) DATA LABELING METHOD BASED ON HARD EXAMPLE MINING AND APPARATUS, COMPUTING DEVICE, AND STORAGE MEDIUM

(71) Applicant: Huawei Cloud Computing Technologies Co., Ltd., Gui'an (CN)

(72) Inventors: Jie Yang, Gui'an (CN); Jiawei Huang, Hangzhou (CN); Yaqiang Yao, Hangzhou (CN); Xiaolong Bai, Hangzhou (CN); Sibao Hong, Hangzhou (CN); Zonghong Dai, Beijing (CN)

(73) Assignee: Huawei Cloud Computing Technologies Co., Ltd., Gui'an (CN)

( * ) Notice: Subject to any disclaimer, the term of this patent is extended or adjusted under 35 U.S.C. 154(b) by 750 days.

(21) Appl. No.: 18/147,602

(22) Filed: Dec. 28, 2022

(65) Prior Publication Data

US 2023/0137533 A1 May 4, 2023

Related U.S. Application Data

(63) Continuation of application No. PCT/CN2021/095735, filed on May 25, 2021.

(30) Foreign Application Priority Data

Jun. 29, 2020 (CN) ......................... 202010605206.2

(51) Int. Cl.
*G06V 10/778* (2022.01)
*G06V 10/774* (2022.01)
*G06V 10/776* (2022.01)

(52) U.S. Cl.
CPC ........ *G06V 10/7788* (2022.01); *G06V 10/774* (2022.01); *G06V 10/776* (2022.01)

(58) Field of Classification Search
CPC ..... G06V 10/70–7796; G06V 10/7788; G06V 10/774; G06V 10/776
See application file for complete search history.

(56) References Cited

U.S. PATENT DOCUMENTS

2007/0216773 A1* 9/2007 Kojima ................ G06V 40/178 707/E17.023
2019/0392242 A1* 12/2019 Tariq ...................... G06V 20/58
2020/0019819 A1* 1/2020 Koushik Bangalore Suryanarayana .... G06N 3/0464

FOREIGN PATENT DOCUMENTS

CN 106372658 A 2/2017
CN 107463954 A 12/2017
(Continued)

OTHER PUBLICATIONS

Xu et al, "Person Re-Identification via Active Hard Sample Mining" (published at https://arxiv.org/abs/2004.04912, Apr. 2020).*
(Continued)

*Primary Examiner* — Casey L Kretzer
(74) *Attorney, Agent, or Firm* — Leydig, Voit & Mayer, Ltd.

(57) ABSTRACT

A data labeling method and apparatus, a computing device, and a storage medium are provided, which belong to the field of artificial intelligence technologies. The method includes: an AI platform determines a plurality of hard examples in an unlabeled image set and hard example attributes of the plurality of hard examples, where the hard example attribute includes a hard example coefficient; the AI platform displays at least one hard example in the plurality of hard examples and a corresponding hard example attribute to a user by using a display interface; and the AI platform obtains a labeling result obtained after the user confirms the at least one hard example in the display interface based on hard example coefficients of the plurality
(Continued)

of hard examples. According to this application, data labeling efficiency is improved, and AI model optimization efficiency is improved.

20 Claims, 12 Drawing Sheets

(56) References Cited

FOREIGN PATENT DOCUMENTS

| | | | |
|---|---|---|---|
| CN | 110610197 | A | 12/2019 |
| WO | 2021051918 | A1 | 3/2021 |

OTHER PUBLICATIONS

Wang et al, "Cost-effective Object Detection: Active Sample Mining with Switchable Selection Criteria" (published at https://arxiv.org/abs/1807.00147, Jan. 2019).*

* cited by examiner

| Target | Target detection | | |
|---|---|---|---|
| Identifier | 1111 | Name | Target |
| Label type | Target detection | Whether an image is labeled by a team | No |
| Created at | 8/16/2019 | Data set input location | test/image |
| Label set | People ☐ Vehicle ☐ | | |
| Version name | — | | |

FIG. 6

| Hard example type | Meaning |
| --- | --- |
| 1 | Normal frame |
| 2 | False detection frame |
| ... | ... |

FIG. 7

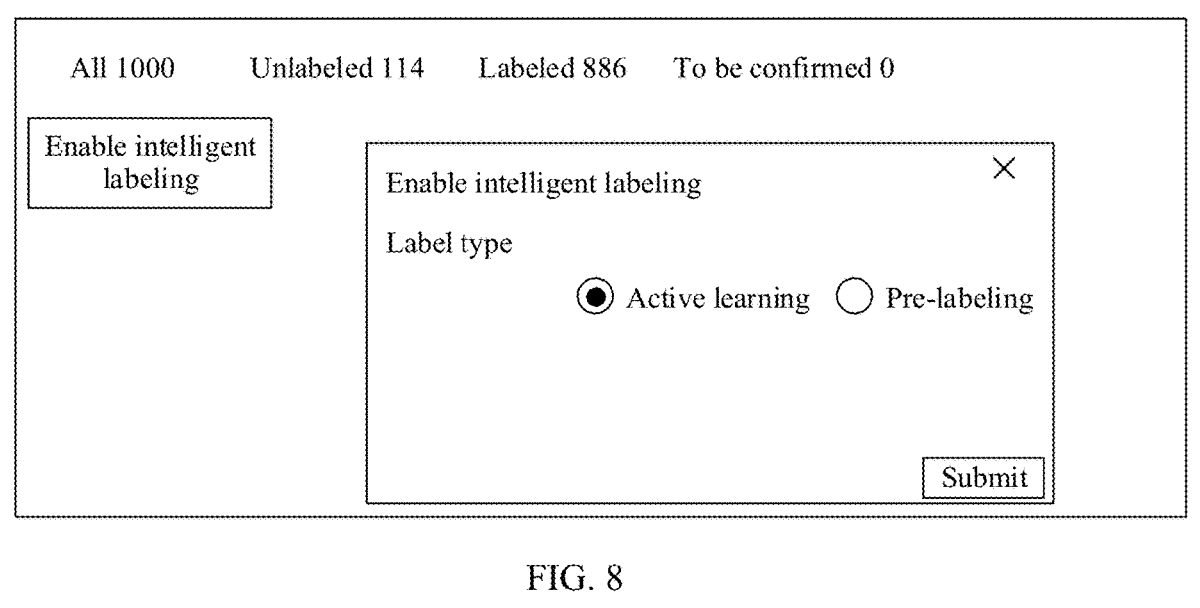

All 1000 Unlabeled 114 Labeled 886 To be confirmed 0

Enable intelligent labeling

Enable intelligent labeling

×

Label type

◉ Active learning ○ Pre-labeling

Submit

FIG. 8

Person

Hard example 4

Person

Person

Hard example 1

Hard example 2

Hard example 3

Hard example 4

Label:

| Label | Labeled box | Operation |
| --- | --- | --- |
| Person | ☐ | Deletion and modification |
| Person | ☐ | Deletion and modification |
| Person | ☐ | Deletion and modification |

Hard example type:

A red box is a false detection box, and a position or label may be incorrect

A yellow box is a missed detection box, and may represent AI model missed detection A blue box may be a correct box predicted by an AI model

| Hard example reasons | Suggestion information |
| --- | --- |
| Successive images are inconsistent | Add similar images |
| ... | ... |

FIG. 10

DATA LABELING METHOD BASED ON HARD EXAMPLE MINING AND APPARATUS, COMPUTING DEVICE, AND STORAGE MEDIUM

CROSS-REFERENCE TO RELATED APPLICATIONS

This application is a continuation of International Application No. PCT/CN2021/095735, filed on May 25, 2021, which claims priority to Chinese Patent Application No. 202010605206.2, filed on Jun. 29, 2020. The disclosures of the aforementioned applications are hereby incorporated by reference in their entireties.

TECHNICAL FIELD

Embodiments of this application relate to the field of artificial intelligence technologies, and in particular, to a data labeling method and apparatus, a computing device, and a storage medium.

BACKGROUND

With development of internet technologies, an artificial intelligence (AI) technology is applied to a growing quantity of fields. In addition, numerous problems related to AI, such as data obtaining, data processing, data labeling, and model training, need to be urgently resolved. This inspires people to build AI platforms to provide developers and users with convenient AI development environments, convenient development tools, and the like. The AI platform may be applied to a plurality of scenarios, such as image classification and target detection. Image classification is an artificial intelligence technology for image classification and recognition. Target detection is an artificial intelligence technology to accurately position, classify, and recognize an object in an image or a video. The AI platform needs to use a large amount of sample data to train AI models.

In a related technology, to reduce labels of sample data, a user first labels a small amount of sample data, and the AI platform trains an AI model based on the small amount of labeled sample data. The AI platform uses the AI model in a semi-training state to perform inference on the labeled sample data to obtain an inference result. Then, the user confirms inference results one by one to obtain a large amount of labeled sample data, and then continues to perform fine-tuning training on the AI model by using the large amount of labeled sample data.

In this way, because each piece of unlabeled sample data needs to be confirmed, data labeling time is long and labor costs are high. Consequently, AI model optimization efficiency is low.

SUMMARY

This application provides a data labeling method, and the method can reduce labels of data and improve optimization efficiency of an AI model.

According to a first aspect, this application provides a data labeling method. The method includes: determining a plurality of hard examples in an unlabeled image set and hard example attributes of the plurality of hard examples, where the hard example attribute includes a hard example coefficient; displaying at least one hard example in the plurality of hard examples and a corresponding hard example attribute to a user by using a display interface; and obtaining a labeling result obtained after the user confirms the at least one hard example in the display interface based on hard example coefficients of the plurality of hard examples.

In the solution shown in this application, the method may be performed by an AI platform, and the AI platform may perform hard example mining on the unlabeled image set, to obtain the plurality of hard examples in the unlabeled image set and the hard example attributes of the plurality of hard examples. The AI platform displays, to the user by using the display interface, the at least one hard example in the plurality of hard examples and the hard example attribute corresponding to the at least one hard example. The user may confirm the at least one displayed hard example, and the AI platform may obtain the labeling result obtained after confirmation. Because the AI platform can provide a hard example for the user, the user only needs to confirm the hard example, and does not need to label a large quantity of unlabeled images, so that labeling efficiency can be improved, and efficiency of optimizing an AI model can be further improved. In addition, the user is further provided with a hard example attribute, so that the user better understands the hard example, and labeling efficiency is further improved.

In a possible implementation, the hard example attribute further includes a hard example reason, and the displaying at least one hard example in the plurality of hard examples and a corresponding hard example attribute by using a display interface further includes: displaying, by using the display interface, a hard example reason corresponding to the at least one hard example and suggestion information corresponding to the hard example reason, where the suggestion information indicates a processing manner that can be performed to reduce hard examples with corresponding hard example reasons.

In the solution shown in this application, the hard example attribute may further include the hard example reason. When displaying a hard example in the display interface, the AI platform not only displays the hard example coefficient of the at least one hard example, but also may display the hard example reason of the at least one hard example and the suggestion information corresponding to the hard example reason. In this way, the user can better understand the hard example, the user can confirm the labeling result more quickly, and a processing manner for reducing hard examples by the user is provided, so that the user can take corresponding measures to quickly reduce the hard examples.

In a possible implementation, the hard example attribute further includes a hard example type, and the hard example type includes error detection, missed detection, or normal prediction. In this way, a specific type of hard example can be quickly distinguished.

In a possible implementation, the displaying at least one hard example in the plurality of hard examples and a corresponding hard example attribute by using a display interface includes: displaying, by using the display interface, different hard example types by using different display colors or different display lines. In this way, hard examples can be distinguished more quickly.

In a possible implementation, the determining a plurality of hard examples in an unlabeled image set and hard example attributes of the plurality of hard examples includes: determining the plurality of hard examples in the unlabeled image set and the hard example attributes of the plurality of hard examples according to a hard example mining algorithm.

In a possible implementation, after the obtaining a labeling result obtained after the user confirms the at least one hard example in the display interface based on hard example coefficients of the plurality of hard examples, the method further includes: obtaining a weight for a hard example reason of each hard example in the at least one hard example; analyzing the labeling result, and if a target hard example in the at least one hard example is confirmed by the user as a correct hard example, increasing the weight corresponding to the hard example reason of the target hard example; or in the labeling result, if the target hard example is confirmed by the user as an incorrect hard example, decreasing the weight corresponding to the hard example reason of the target hard example; and updating the hard example mining algorithm based on updated weights.

In the solution shown in this application, each hard example reason in the hard example mining algorithm corresponds to a weight. After the AI platform obtains the labeling result confirmed by the user, the AI platform may analyze the labeling result. If the target hard example in the at least one hard example is confirmed by the user as the correct hard example (the correct hard example is a hard example that is in hard examples mined by using the hard example mining algorithm and that is considered by the user as a hard example), the weight corresponding to the hard example reason of the target hard example may be increased. In the labeling result, if the target hard example is confirmed by the user as the incorrect hard example (the incorrect hard example is a hard example that is in hard examples mined by using the hard example mining algorithm and that is considered by the user as a non-hard example), the weight corresponding to the hard example reason of the target hard example may be decreased, and then the AI platform updates the hard example mining algorithm based on the updated weights. In this way, the weight of each hard example reason in the hard example mining algorithm may be updated based on the labeling result confirmed by the user, so that accuracy of mining hard examples by using the hard example mining algorithm is rapidly improved.

In a possible implementation, the displaying at least one hard example in the plurality of hard examples and a corresponding hard example attribute to a user by using a display interface includes: obtaining a hard example coefficient filtering range and/or display order selected by the user in the display interface; and displaying the at least one hard example and the corresponding hard example attribute by using the display interface based on the hard example coefficient filtering range and/or display order.

In the solution shown in this application, the AI platform provides a hard example filtering and display manner. The user may select the hard example coefficient filtering range and/or display order in the display interface. The AI platform may display the at least one hard example and the corresponding hard example attribute by using the display interface based on the hard example coefficient filtering range and/or display order. In this way, a more flexible display manner is provided.

In a possible implementation, the method further includes: when the at least one hard example is a plurality of hard examples, displaying, by using the display interface, statistical information corresponding to the unlabeled image set, where the statistical information includes one or more of distribution information of non-hard examples and hard examples in the unlabeled image set, hard example distribution information of various hard example reasons in the unlabeled image set, hard example distribution information of various hard example coefficient ranges in the unlabeled image set, and hard example distribution information of various hard example types in the unlabeled image set. In this way, the user can determine the inference performance of the current AI model by using the distribution information of non-hard examples and hard examples, or, the user can learn distribution of the hard examples in terms of the hard example reasons, so that the user can take targeted measures to reduce the hard examples, and so on.

According to a second aspect, a method for updating a hard example mining algorithm is provided. The method includes: determining a plurality of hard examples in an unlabeled image set by using the hard example mining algorithm; displaying at least one hard example in the plurality of hard examples to a user by using a display interface; and updating the hard example mining algorithm based on a labeling result obtained after the user confirms the at least one hard example by using the display interface.

In the solution shown in this application, the method may be performed by an AI platform, the AI platform may determine a plurality of unlabeled hard examples by using the hard example mining algorithm, and the AI platform may display the at least one hard example in the plurality of hard examples to the user in the display interface. The user may confirm the at least one hard example in the display interface. The AI platform obtains the labeling result obtained after the user confirms the at least one hard example in the display interface, and then the AI platform updates the hard example mining algorithm based on the labeling result. In this way, because the hard example mining algorithm can be inversely updated based on the labeling result confirmed by the user, accuracy of hard example prediction can be increasingly high.

In a possible implementation, the method further includes: determining hard example reasons of the plurality of hard examples by using the hard example mining algorithm, and providing suggestion information corresponding to the hard example reasons for the user by using the display interface, where the suggestion information indicates a processing manner that can be performed to reduce hard examples with corresponding hard example reasons.

In the solution shown in this application, the AI platform may further determine the hard example reasons of the plurality of hard examples by using the hard example mining algorithm, and display the hard example reasons and the corresponding suggestion information in the display interface. In this way, the user can better understand the hard examples and may take corresponding measures to reduce the hard examples, so that prediction performance of the trained AI model is better.

In a possible implementation, the updating the hard example mining algorithm based on a labeling result obtained after the user confirms the at least one hard example by using the display interface includes: obtaining a weight for a hard example reason of each hard example in the at least one hard example; analyzing the labeling result, and if a target hard example in the at least one hard example is confirmed by the user as a correct hard example, increasing the weight corresponding to the hard example reason of the target hard example; or in the labeling result, if the target hard example is confirmed by the user as an incorrect hard example, decreasing the weight corresponding to the hard example reason of the target hard example; and updating the hard example mining algorithm based on updated weights.

In the solution shown in this application, each hard example reason in the hard example mining algorithm corresponds to a weight. After the AI platform obtains the labeling result confirmed by the user, the AI platform may analyze the labeling result. If the target hard example in the at least one hard example is confirmed by the user as the correct hard example (the correct hard example is a hard example that is in hard examples mined by using the hard example mining algorithm and that is considered by the user as a hard example), the weight corresponding to the hard example reason of the target hard example may be increased. In the labeling result, if the target hard example is confirmed by the user as the incorrect hard example (the incorrect hard example is a hard example that is in hard examples mined by using the hard example mining algorithm and that is considered by the user as a non-hard example), the weight corresponding to the hard example reason of the target hard example may be decreased, and then the AI platform updates the hard example mining algorithm based on the updated weights. In this way, the weight of each hard example reason in the hard example mining algorithm may be updated based on the labeling result confirmed by the user, so that accuracy of mining hard examples by using the hard example mining algorithm is rapidly improved.

In a possible implementation, the method further includes: displaying a hard example attribute corresponding to the at least one hard example by using the display interface, where the hard example attribute includes one or more of a hard example coefficient, a hard example reason, and a hard example type. In this way, more content about the hard example is displayed to the user, so that the user better understands the hard example, and confirmation efficiency is improved.

According to a third aspect, a data labeling apparatus is provided. The apparatus includes a hard example mining module, configured to determine a plurality of hard examples in an unlabeled image set and hard example attributes of the plurality of hard examples, where the hard example attribute includes a hard example coefficient; and a user input/output (I/O) module, configured to: display at least one hard example in the plurality of hard examples and a corresponding hard example attribute to a user by using a display interface; and obtain a labeling result obtained after the user confirms the at least one hard example in the display interface based on hard example coefficients of the plurality of hard examples. In this way, because a hard example can be provided for the user, the user only needs to confirm the hard example, and does not need to label a large quantity of unlabeled images, so that labeling efficiency can be improved, and efficiency of optimizing an AI model can be further improved. In addition, the user is further provided with a hard example attribute, so that the user better understands the hard example, and labeling efficiency is further improved.

In a possible implementation, the hard example attribute further includes a hard example reason, and the user I/O module is further configured to:

display, by using the display interface, a hard example reason corresponding to the at least one hard example and suggestion information corresponding to the hard example reason, where the suggestion information indicates a processing manner that can be performed to reduce hard examples with corresponding hard example reasons. In this way, the user can better understand the hard example, the user can confirm the labeling result more quickly, and a processing manner for reducing hard examples by the user is provided, so that the user can take corresponding measures to quickly reduce the hard examples.

In a possible implementation, the hard example attribute further includes a hard example type, and the hard example type includes error detection, missed detection, or normal prediction. In this way, a specific type of hard example can be quickly distinguished.

In a possible implementation, the user I/O module is further configured to display, by using the display interface, different hard example types by using different display colors or different display lines.

In a possible implementation, the hard example mining module is specifically configured to determine the plurality of hard examples in the unlabeled image set and the hard example attributes of the plurality of hard examples according to a hard example mining algorithm.

In a possible implementation, the apparatus further includes a model training module, configured to: obtain a weight for a hard example reason of each hard example in the at least one hard example after the labeling result obtained after the user confirms the at least one hard example in the display interface based on hard example coefficients of the plurality of hard examples is obtained; analyze the labeling result, and if a target hard example in the at least one hard example is confirmed by the user as a correct hard example, increase the weight corresponding to the hard example reason of the target hard example; or if the target hard example is confirmed by the user as an incorrect hard example, decrease the weight corresponding to the hard example reason of the target hard example; and update the hard example mining algorithm based on updated weights. In this way, the weight of each hard example reason in the hard example mining algorithm may be updated based on the labeling result confirmed by the user, so that accuracy of mining hard examples by using the hard example mining algorithm is rapidly improved.

In a possible implementation, the user I/O module is configured to: obtain a hard example coefficient filtering range and/or display order selected by the user in the display interface; and display the at least one hard example and the corresponding hard example attribute by using the display interface based on the hard example coefficient filtering range and/or display order. In this way, a more flexible display manner is provided.

In a possible implementation, the user I/O module is further configured to: when the at least one hard example is a plurality of hard examples, display, by using the display interface, statistical information corresponding to the unlabeled image set, where the statistical information includes one or more of distribution information of non-hard examples and hard examples in the unlabeled image set, hard example distribution information of various hard example reasons in the unlabeled image set, hard example distribution information of various hard example coefficient ranges in the unlabeled image set, and hard example distribution information of various hard example types in the unlabeled image set. In this way, the user can determine the inference performance of the current AI model by using the distribution information of non-hard examples and hard examples, or, the user can learn distribution of the hard examples in terms of the hard example reasons, so that the user can take targeted measures to reduce the hard examples, and so on.

According to a fourth aspect, an apparatus for updating a hard example mining algorithm is provided. The apparatus includes: a hard example mining module, configured to determine a plurality of hard examples in an unlabeled image set by using a hard example mining algorithm;

a user input/output I/O module, configured to display at least one hard example in the plurality of hard examples to a user by using a display interface; and a model training module, configured to update the hard example mining algorithm based on a labeling result obtained after the user confirms the at least one hard example by using the display interface.

In this way, because the hard example mining algorithm can be inversely updated based on the labeling result confirmed by the user, accuracy of hard example prediction can be increasingly high.

In a possible implementation, the hard example mining module is further configured to determine hard example reasons of the plurality of hard examples by using the hard example mining algorithm, and the user I/O module is further configured to provide suggestion information corresponding to the hard example reasons for the user by using the display interface, where the suggestion information indicates a processing manner that can be performed to reduce hard examples with corresponding hard example reasons. In this way, the user can better understand the hard examples and may take corresponding measures to reduce the hard examples, so that prediction performance of the trained AI model is better.

In a possible implementation, the model training module is configured to: obtain a weight for a hard example reason of each hard example in the at least one hard example; analyze the labeling result, and if a target hard example in the at least one hard example is confirmed by the user as a correct hard example, increase the weight corresponding to the hard example reason of the target hard example; or if the target hard example is confirmed by the user as an incorrect hard example, decrease the weight corresponding to the hard example reason of the target hard example; and update the hard example mining algorithm based on updated weights. In this way, the weight of each hard example reason in the hard example mining algorithm may be updated based on the labeling result confirmed by the user, so that accuracy of mining hard examples by using the hard example mining algorithm is rapidly improved.

In a possible implementation, the user I/O module is configured to display a hard example attribute corresponding to the at least one hard example by using the display interface, where the hard example attribute includes one or more of a hard example coefficient, a hard example reason, and a hard example type. In this way, more content about the hard example is displayed to the user, so that the user better understands the hard example, and confirmation efficiency is improved.

According to a fifth aspect, this application further provides a computing device, where the computing device includes a memory and a processor, the memory is configured to store a group of computer instructions, and the processor executes the group of computer instructions stored in the memory, so that the computing device is enabled to perform the method provided in the first aspect or any possible implementation of the first aspect.

According to a sixth aspect, this application further provides a computing device, where the computing device includes a memory and a processor, the memory is configured to store a group of computer instructions, and the processor executes the group of computer instructions stored in the memory, so that the computing device is enabled to perform the method provided in the second aspect or any possible implementation of the second aspect.

According to a seventh aspect, this application provides a computer-readable storage medium, where the computer-readable storage medium stores computer program code, and when the computer program code is executed by a computing device, the computing device performs the method provided in the first aspect or any possible implementation of the first aspect. The storage medium includes but is not limited to a volatile memory, such as a random access memory, or a non-volatile memory, such as a flash memory, a hard disk drive (HDD), or a solid state drive (SSD).

According to an eighth aspect, this application provides a computer-readable storage medium, where the computer-readable storage medium stores computer program code, and when the computer program code is executed by a computing device, the computing device performs the method provided in the second aspect or any possible implementation of the second aspect. The storage medium includes but is not limited to a volatile memory, such as a random access memory, or a non-volatile memory, such as a flash memory, a hard disk, or a solid state disk.

According to a ninth aspect, this application provides a computer program product, where the computer program product includes computer program code, and when the computer program code is executed by a computing device, the computing device performs the method provided in the first aspect or any possible implementation of the first aspect. The computer program product may be a software installation package. When the method provided in the first aspect or any possible implementation of the first aspect needs to be used, the computer program product may be downloaded and executed on a computing device.

According to a tenth aspect, this application provides a computer program product, where the computer program product includes computer program code, and when the computer program code is executed by a computing device, the computing device performs the method provided in the second aspect or any possible implementation of the second aspect. The computer program product may be a software installation package. When the method provided in the second aspect or any possible implementation of the second aspect needs to be used, the computer program product may be downloaded and executed on a computing device.

BRIEF DESCRIPTION OF DRAWINGS

FIG. 6 is a schematic diagram of a data upload interface according to an embodiment of this application;

FIG. 7 is a schematic diagram of a hard example export interface according to an embodiment of this application;

FIG. 8 is a schematic diagram of an intelligent labeling start interface according to an embodiment of this application;

FIG. 10 is a schematic diagram of a display interface of a single hard example according to an embodiment of this application;

DESCRIPTION OF EMBODIMENTS

Figure 1:
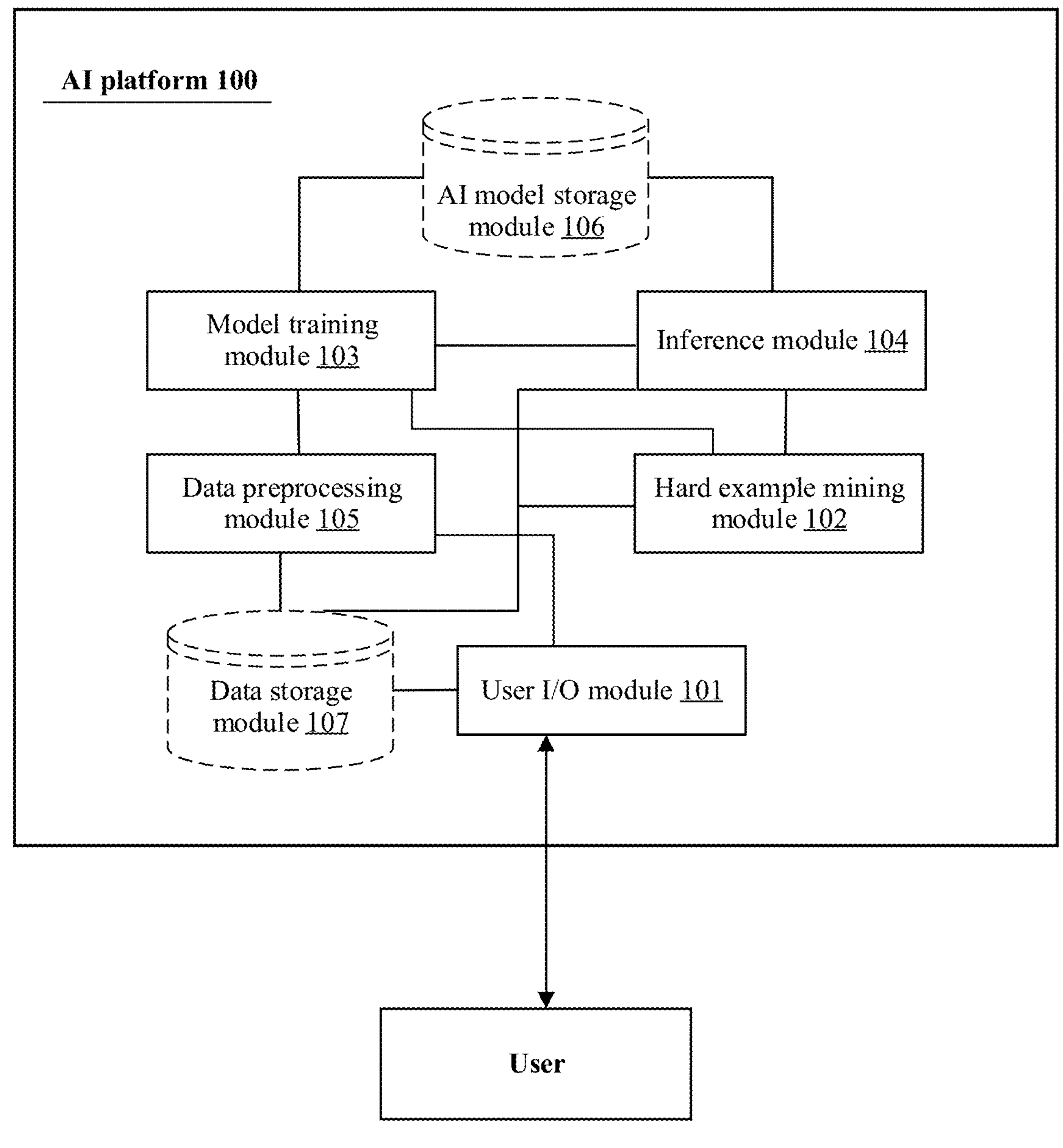
FIG. 1 is a schematic diagram of a structure of an AI platform 100 according to an embodiment of this application.

To make objectives, technical solutions, and advantages of this application clearer, the following further describes implementations of this application in detail with reference to the accompanying drawings.

At present, artificial intelligence is booming. Machine learning is a core means to implement AI. Machine learning penetrates into various industries, such as medicine, transportation, education, and finance. Not only professionals, but also non-AI professionals in various industries are looking forward to using AI and machine learning to complete specific tasks.

For ease of understanding the technical solutions and embodiments provided in this application, concepts such as AI model, AI model training, hard example, hard example mining, and AI platform are described in detail below.

The AI model is a type of mathematical algorithm model that resolves an actual problem by using a machine learning idea. The AI model includes a large quantity of parameters and calculation formulas (or calculation rules). The parameters in the AI model are values that can be obtained by training the AI model by using a training image set. For example, the parameters of the AI model are weights of calculation formulas or calculation factors in the AI model. The AI model further includes some hyper parameters. The hyper parameter is a parameter that cannot be obtained by training the AI model by using the training image set. The hyper parameter may be used to guide AI model construction or AI model training. There are a plurality of hyper parameters, for example, a quantity of times of iteration of AI model training, a learning rate, a batch size, a quantity of layers of the AI model, and a quantity of neurons of each layer. In other words, a difference between the hyper parameter and the parameter of the AI model lies in that a value of the hyper parameter of the AI model cannot be obtained by analyzing a training image in the training image set, but a value of the parameter of the AI model can be modified and determined based on analysis performed on the training image in the training image set in a training process.

There are a variety of AI models, and a type of widely used AI model is a neural network model, which is a mathematical algorithm model that imitates a structure and a function of a biological neural network (a central nervous system of animals). One neural network model may include a plurality of neural network layers with different functions, and each layer includes parameters and calculation formulas. Different layers in the neural network model have different names based on different calculation formulas or different functions. For example, a layer on which convolution calculation is performed is referred to as a convolutional layer, and the convolutional layer is usually used to perform feature extraction on an input signal (such as an image). One neural network model may alternatively include a combination of a plurality of existing neural network models. Neural network models with different structures may be used in different scenarios (such as classification and recognition) or may provide different effects when used in a same scenario. That the neural network model has different structures specifically includes one or more of the following: A quantity of network layers in the neural network model differs, a sequence of the network layers differs, and the network layers have different weights, parameters, or calculation formulas. There are already a plurality of different neural network models with high accuracy in an application scenario such as recognition or classification in the industry. Some neural network models may be trained by a specific training image set and used to complete a task alone, or combined with another neural network model (or another functional module) to complete a task.

In addition to the neural network model, most other AI models need to be trained before being used to complete a task.

AI model training means that existing samples are used to enable, by using a method, the AI model to fit a rule in the existing samples, to determine parameters in the AI model. For example, to train an AI model used for image classification or detection and recognition, a training image set needs to be prepared, and training of the AI model may be classified into supervised training and unsupervised training based on whether a training image in the training image set has a label (that is, whether the image has a specific type or name). When supervised training is performed on the AI model, a training image in the training image set used for training has a label. When the AI model is trained, a training image in the training image set is used as an input of the AI model, a label corresponding to the training image is used as a reference of an output value of the AI model, a loss value between the output value of the AI model and the label corresponding to the training image is calculated by using a loss function, and parameters in the AI model are adjusted based on the loss value. The AI model is iteratively trained by using each training image in the training image set, and the parameters of the AI model are continuously adjusted, until the AI model can output, with high accuracy based on the input training image, an output value the same as the label corresponding to the training image. When unsupervised training is performed on the AI model, a training image in an image set used for training has no label. Training images in the training image set are sequentially input to the AI model, and the AI model gradually recognizes an association and a potential rule between the training images in the training image set, until the AI model can be used to determine or recognize a type or a feature of the input image. For example, after receiving a large quantity of training images, an AI model used for clustering may learn a feature of each training image and an association and a difference between the training images, to automatically classify the training images into a plurality of types. Different AI models may be used for different task types. Some AI models may be trained only in a supervised learning manner, some AI models may be trained only in an unsupervised learning manner, and some other AI models may be trained both in a supervised learning manner and in an unsupervised learning manner. A trained AI model may be used to complete a specific task. Generally, an AI model in machine learning needs to be trained in a supervised learning manner, and training the AI model in the supervised learning manner may enable the AI model to more pertinently learn, in a training image set with labels, an association between a training image and a corresponding label in the training image set, so that the trained AI model has high accuracy when being used to predict another input inference image.

An example in which a neural network model used for an image classification task is trained in a supervised learning manner is provided below. To train a neural network model used for completing an image classification task, images are first collected based on the task, and a training image set is constructed. The constructed training image set includes three types of images, which are respectively: apple, pear, and banana. The collected training images are respectively stored in three folders based on types. A name of the folder is a label of all images in the folder. After the training image set is constructed, a neural network model that can implement image classification (for example, a convolutional neural network (CNN)) is selected, the training images in the training image set are input to the CNN, a convolution kernel of each layer in the CNN performs feature extraction and feature classification on the images, confidence in which an image belongs to each type is finally output, a loss value is calculated based on the confidence and a label corresponding to the image by using a loss function, and parameters of each layer in the CNN are updated based on the loss value and the CNN structure. The foregoing training process continues until the loss value output by the loss function converges or all images in the training image set are used for training, and then the training ends.

The loss function is a function used to measure a degree to which the AI model is trained (that is, the loss function is used to calculate a difference between a prediction result of the AI model and a real target). In a process of training the AI model, because it is expected that an output of the AI model is close, to the greatest extent, to a value that is really expected to be obtained through prediction, a predicted value of the current AI model based on an input image may be compared with the real desired target value (namely, a label of the input image), and then the parameters in the AI model are updated based on a difference between the two (certainly, before the first update, there is usually an initialization process, that is, initial values are preconfigured for the parameters in the AI model). During each time of training, a difference between the predicted value of the current AI model and the real target value is determined by using the loss function, and the parameters of the AI model are updated until the AI model can predict the real desired target value or a value that is quite close to the real desired target value. In this case, it is considered that the training of the AI model is completed.

After the training of the AI model is completed, the trained AI model may be used to perform inference on an image, to obtain an inference result. For example, in a scenario of image classification, a specific inference process is as follows: An image is input to the AI model, the convolution kernel of each layer in the AI model performs feature extraction on the image, and a category to which the image belongs is output based on an extracted feature. In a scenario of target detection (which may also be referred to as object detection), an image is input to the AI model, the convolution kernel of each layer in the AI model performs feature extraction on the image, and a position and a category of a bounding box of each target included in the image are output based on an extracted feature. In scenarios covering image classification and target detection, an image is input to the AI model, the convolution kernel of each layer in the AI model performs feature extraction on the image, and a category to which the image belongs, and a position and a category of a bounding box of each target included in the image are output based on an extracted feature. It should be noted herein that, for AI models, some AI models have strong inference capabilities, and some AI models have weak inference capabilities. The strong inference capability of the AI model means that accuracy of an inference result is greater than or equal to a particular value when the AI model is used to perform inference on an image. The weak inference capability of the AI model means that accuracy of the inference result is less than the particular value when the AI model is used to perform inference on the image.

Data labeling is a process of adding a label in a corresponding scenario to unlabeled data. For example, the unlabeled data is an unlabeled image. In a scenario of image classification, a category to which the unlabeled image belongs is added to the unlabeled image, and in a scenario of target detection, position information and a category are added to a target in the unlabeled image.

A hard example is input data of a corresponding model when a result output by an initial AI model or a trained AI model is incorrect or has a high error rate in a process of training the initial AI model or in a process of performing inference by the trained AI model. For example, in the process of training the AI model, input data whose loss function value between a prediction result and a label result during training is greater than a particular threshold is used as a hard example. In an inference process of the AI model, an image in an inference image set is input to the AI model, and if an error rate of an output inference result is higher than a target threshold, the corresponding input image is a hard example. In a scenario, the AI model may be alternatively used to perform intelligent labeling on an unlabeled image. A process of performing intelligent labeling by using the AI model is actually also an inference process of the AI model. An input image that is incorrectly labeled or that has a high labeling error rate is determined as a hard example.

Hard example mining is a method for determining an image as a hard example.

An AI platform is a platform that provides a convenient AI development environment and convenient development tools for AI developers and users. Various AI models or AI submodels for resolving different problems are built in the AI platform. The AI platform may search for and establish applicable AI models based on a user requirement. The user only needs to determine a requirement of the user in the AI platform and prepare a training image set as prompted and upload the training image set to the AI platform. The AI platform can train an AI model that can be used to implement the user requirement for the user. Alternatively, the user prepares an algorithm and a training image set of the user as prompted, and uploads the algorithm and the training image set to the AI platform. The AI platform may train, based on the algorithm and the training image set of the user, an AI model that can be used to implement the user requirement. The user may use the trained AI model to complete a specific task of the user.

A hard example mining technology is introduced to the AI platform in embodiments of this application, so that the AI platform forms a closed-loop process of AI model construction, training, inference, hard example mining, retraining, and re-inference.

It should be noted that the AI model mentioned above is understood in a general sense, and the AI model includes a deep learning model, a machine learning model, and the like.

FIG. 1 is a schematic diagram of a structure of an AI platform 100 according to an embodiment of this application. It should be understood that, FIG. 1 is merely an example schematic diagram of a structure of the AI platform 100. Module division in the AI platform 100 is not limited in this application. As shown in FIG. 1, the AI platform 100 includes a user input/output (I/O) module 101, a hard example mining module 102, a model training module 103, an inference module 104, and a data preprocessing module 105. Optionally, the AI platform may further include an AI model storage module 106 and a data storage module 107.

The following briefly describes functions of the modules in the AI platform 100.

The user I/O module 101 is configured to receive a task target input or selected by a user, receive a training image set of the user, and the like. The user I/O module 101 is further configured to receive a labeling confirmation of the user for a hard example, and obtain one or more images with labels from the user. Certainly, the user I/O module 101 is further configured to provide an AI model for another user, and the like. In an example of the user I/O module 101, a graphical user interface (GUI) or a command line interface (CLI) may be used for implementation. For example, the GUI displays the AI platform 100, which may provide a plurality of AI services (such as an image classification service and a target detection service) for the user. The user may select a task target on the GUI. For example, if the user selects an image classification service, the user may continue to upload a plurality of unlabeled images in the GUI of the AI platform. After receiving the task target and the plurality of unlabeled images, the GUI communicates with the model training module 103. The model training module 103 selects or searches for, for the user based on the task target determined by the user, a constructed AI model that can be used to complete the task target of the user. The user I/O module 101 is further configured to: receive a hard example output by the hard example mining module 102, and provide the GUI for the user to confirm and process the hard example.

Optionally, the user I/O module 101 may be further configured to receive an effect expectation that is input by the user and that is of the AI model for completing the task target. For example, that accuracy of the finally obtained AI model for face recognition is greater than 99% is input or selected.

Optionally, the user I/O module 101 may be further configured to receive an AI model input by the user, and the like. For example, the user may input an initial AI model in the GUI based on a task target of the user.

Optionally, the user I/O module 101 may be further configured to receive a superficial feature and a deep feature of an unlabeled image that is in an unlabeled image set and that is input by the user. In a scenario of image classification, the superficial feature includes one or more of resolution of the image, an aspect ratio of the image, an average value and a variance of red, green, and blue (RGB) of the image, brightness of the image, saturation of the image, and definition of the image, and the deep feature is an abstract feature that is of an image and that is extracted by using a convolution kernel in a feature extraction model (such as a CNN). In a scenario of target detection, the superficial feature includes a superficial feature of a bounding box and a superficial feature of an image, the superficial feature of the bounding box may include one or more of an aspect ratio of each bounding box in a single-frame image, a ratio of an area of each bounding box in the single-frame image to an area of the image, a degree of marginalization of each bounding box in the single-frame image, a stacked plot of each bounding box in the single-frame image, brightness of each bounding box in the single-frame image, and fuzziness of each bounding box in the single-frame image. The superficial feature of the image may include one or more of resolution of the image, an aspect ratio of the image, an average value and a variance of RGB of the image, brightness of the image, saturation of the image, definition of the image, a quantity of boxes in the single-frame image, and a variance of an area of the boxes in the single-frame image. The deep feature is an abstract feature that is of an image and that is extracted by using a convolution kernel in a feature extraction model (such as a CNN).

Optionally, the user I/O module 101 may be further configured to provide a GUI for the user to label a training image in a training image set.

Optionally, the user I/O module 101 may be further configured to provide various pre-built-in initial AI models for the user to select. For example, the user may select an initial AI model in the GUI based on a task target of the user.

Optionally, the user I/O module 101 may be further configured to receive various configuration information of the user for the initial AI model and a training image in the training image set, and the like.

The hard example mining module 102 is configured to determine a hard example and a hard example attribute in the unlabeled image set received by the user I/O module 101. The hard example mining module 102 may communicate with both the inference module 104 and the user I/O module 101. The hard example mining module 102 may obtain, from the inference module 104, an inference result of inference performed by the inference module 104 on an unlabeled image in the unlabeled image set, and mine a hard example and a hard example attribute in the unlabeled image set based on the inference result. The hard example mining module 102 may further provide the mined hard example and hard example attribute for the user I/O module 101. The hard example attribute is used to guide the user in performing labeling confirmation on the hard example.

Optionally, the hard example mining module 102 may be further configured to obtain, from the user I/O module 101, the superficial feature and the deep feature of the unlabeled image that is in the unlabeled image set and that is input by the user.

The model training module 103 is configured to train an AI model. The model training module 103 may communicate with all of the user I/O module 101, the inference module 104, and the AI model storage module 106. Specific processing is as follows:

The initial AI model includes an AI model that is not trained, and an AI model that is trained but not optimized based on a hard example. The AI model that is not trained means that the constructed AI model is not trained by using a training image set, and all parameters in the constructed AI model are preset values. The AI model that is trained but not optimized based on a hard example is an AI model that can be used for inference but is not optimized based on a hard example, and may include two types: one is an initial AI model directly selected by the user in the AI model storage module 106, and the other is an AI model obtained by training the constructed AI model only by using a training image with a label in the training image set. It can be learned that the AI platform may obtain the initial AI model from the AI model storage module 106, or train the training image set by using the model training module 103, to obtain the initial AI model.

The initial AI model is an AI model obtained by training the constructed AI model only by using a training image with a label in the training image set, and specific processing is as follows: The AI platform determines, for the user based on a task target of the user, a constructed AI model used to complete the task target of the user. The model training module 103 may communicate with both the user I/O module 101 and the AI model storage module 106. The model training module 103 selects, based on the task target of the user, an existing AI model from an AI model library stored in the AI model storage module 106 as the constructed AI model, or the model training module 103 searches the AI model library for an AI submodel structure based on the task target of the user, an expected effect of the user for the task target, or some configuration parameters input by the user, and specifies some hyper parameters of the AI model, for example, a quantity of layers of the model, and a quantity of neurons of each layer, to construct an AI model. Finally, a constructed AI model is obtained. It should be noted that, some hyper parameters of the AI model may be hyper parameters determined by the AI platform based on experience of constructing and training the AI model.

The model training module 103 obtains the training image set from the user I/O module 101. The model training module 103 determines, based on a feature of the training image set and a structure of the constructed AI model, some hyper parameters during training of the constructed AI model, such as a quantity of times of iteration, a learning rate, and a batch size. After the hyper parameters are set, the model training module 103 performs automatic training on the constructed AI model by using an image with a label in the obtained training image set, and continuously updates parameters inside the constructed AI model in a training process, to obtain the initial AI model. It should be noted that, some hyper parameters used during training of the constructed AI model may be hyper parameters determined by the AI platform based on model training experience.

The model training module 103 inputs an unlabeled image in the training image set to the initial AI model, and outputs an inference result of the unlabeled image, and the model training module 103 transmits the inference result to the hard example mining module 102, and the hard example mining module 102 mines a hard example and a hard example attribute in the unlabeled image based on the inference result. The hard example mining module 102 feeds back the determined hard example and hard example attribute to the user I/O module 101. The user I/O module 101 obtains the hard example on which the user performs labeling confirmation, and feeds back the hard example on which the user performs labeling confirmation to the model training module 103. The model training module 103 continues to perform fine-tuning training on the initial AI model based on the hard example provided by the user I/O module 101, to obtain an optimized AI model, and optimizes the hard example mining module 102. The model training module 103 provides the optimized AI model to the inference module 104 for inference processing. It should be noted herein that, if the initial AI model is the initial AI model stored in the AI model storage module 106, training images in the training image set may be all unlabeled images. If the initial AI model is the constructed AI model, training images in the training image set include some unlabeled images and some images with labels.

The inference module 104 performs inference on the unlabeled image in the unlabeled image set by using the optimized AI model, and outputs an inference result of the unlabeled image in the unlabeled image set. The hard example mining module 102 obtains an inference result from the inference module 104, and determines a hard example and a hard example attribute in the unlabeled image set based on the inference result. The hard example mining module 102 feeds back the determined hard example and hard example attribute to the user I/O module 101. The user I/O module 101 obtains the hard example on which the user performs labeling confirmation, and feeds back the hard example on which the user performs labeling confirmation to the model training module 103. The model training module 103 continues to train the optimized AI model based on the hard example provided by the user I/O module 101, to obtain a more optimized AI model. The model training module 103 transmits the more optimized AI model to the AI model storage module 106 for storage, and transmits the more optimized AI model to the inference module 104 for inference processing. It should be noted herein that, when the inference module 104 performs inference on the unlabeled image in the unlabeled image set to obtain a hard example, and then optimizes the optimized AI model, the optimization process is actually the same as that of using the hard example in the training image to optimize the initial AI model. In this case, the hard example in the unlabeled image is used as a training image.

Optionally, the model training module 103 may be further configured to determine the AI model selected by the user in the GUI as the initial AI model. Alternatively, the AI model input by the user in the GUI is determined as the initial AI model.

Optionally, the initial AI model may further include an AI model obtained by training the AI model in the AI model storage module 106 by using an image in the training image set.

The inference module 104 is configured to perform inference on the unlabeled image in the unlabeled image set based on the AI model, to obtain an inference result. The inference module 104 may communicate with all of the hard example mining module 102, the user I/O module 101, and the AI model storage module 106. The inference module 104 obtains the unlabeled image in the unlabeled image set from the user I/O module 101, and performs inference processing on the unlabeled image in the unlabeled image set to obtain an inference result of the unlabeled image in the unlabeled image set. The inference module 104 transmits the inference result to the hard example mining module 102, so that the hard example mining module 102 mines the hard example and the hard example attribute in the unlabeled image set based on the inference result.

The data preprocessing module 105 is configured to perform a preprocessing operation on the training image in the training image set and the unlabeled image in the unlabeled image set that are received by the user I/O module 101. The data preprocessing module 105 may read, from the data storage module 107, the training image set or the unlabeled image set received by the user I/O module 101, and further preprocess the unlabeled image in the unlabeled image set or the training image in the training image set. Preprocessing the training image in the training image set uploaded by the user or the unlabeled image in the unlabeled image set uploaded by the user can enable the training image in the training image set or the unlabeled image in the unlabeled image set to be consistent in size, and can further remove inappropriate data in the training image in the training image set or the unlabeled image in the unlabeled image set. The preprocessed training image set may be suitable for training the constructed AI model or training the initial AI model, and may further make a training effect better. The unlabeled image in the preprocessed unlabeled image set may be suitable for inputting to the AI model for inference processing. The data preprocessing module 105 stores the preprocessed training image set or unlabeled image set to the data storage module 107 after the preprocessing of the training image in the training image set or the unlabeled image in the unlabeled image set is completed. Alternatively, the preprocessed training image set is sent to the model training module 103, and the preprocessed unlabeled image set is sent to the inference module 104. It should be understood that, in another embodiment, the data storage module 107 may be alternatively used as a part of the data preprocessing module 105, even if the data preprocessing module 105 has a function of storing images.

The AI model storage module 106 is configured to store the initial AI model, the optimized AI model, the AI submodel structure, and the like, and may be further configured to store the AI model determined and constructed based on the AI submodel structure. The AI model storage module 106 may communicate with both the user I/O module 101 and the model training module 103. The AI model storage module 106 receives and stores the trained initial AI model and optimized AI model that are transmitted by the model training module 103. The AI model storage module 106 provides the constructed AI model or the initial AI model for the model training module 103. The AI model storage module 106 stores the initial AI model that is uploaded by the user and that is received by the user I/O module 101. It should be understood that, in another embodiment, the AI model storage module 106 may be alternatively used as a part of the model training module 103.

The data storage module 107 (which may be, for example, a data storage resource corresponding to an object storage service (OBS) provided by a cloud service provider) is configured to store the training image set and the unlabeled image set that are uploaded by the user, and is further configured to store data processed by the data preprocessing module 105.

It should be noted that, the AI platform in this application may be a system that can interact with the user, and the system may be a software system, a hardware system, or a system combining software and hardware. This is not limited in this application.

Because of functions of the foregoing modules, the AI platform provided in this embodiment of this application may mine the hard example and the hard example attribute from the unlabeled images, to guide the user in performing labeling confirmation on the hard example. Subsequently, the hard example mining algorithm and the initial AI model may continue to be further trained based on the hard example, to obtain the optimized AI model and the optimized hard example mining algorithm, so that the inference result of inference performed by the AI model is more accurate, and the hard example mined by the hard example mining algorithm is more accurate.

Figure 2:
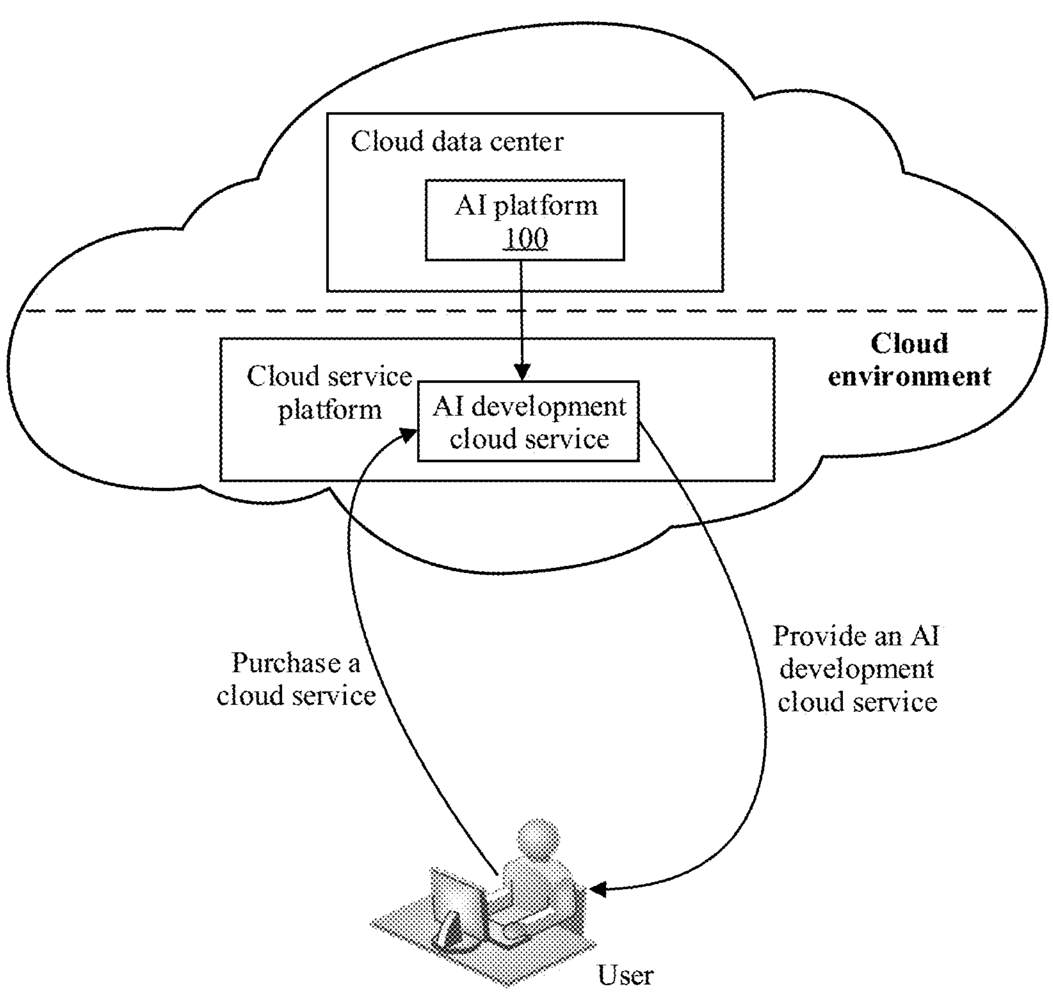
FIG. 2 is a schematic diagram of an application scenario of an AI platform 100 according to an embodiment of this application.

FIG. 2 is a schematic diagram of an application scenario of an AI platform 100 according to an embodiment of this application. As shown in FIG. 2, in an embodiment, the AI platform 100 may be entirely deployed in a cloud environment. The cloud environment is an entity that provides a cloud service for a user by using a basic resource in a cloud computing mode. The cloud environment includes a cloud data center and a cloud service platform. The cloud data center includes a large quantity of basic resources (including a computing resource, a storage resource, and a network resource) owned by a cloud service provider. The computing resource included in the cloud data center may be a large quantity of computing devices (such as a server). The AI platform 100 may be independently deployed on a server or a virtual machine in the cloud data center, or the AI platform 100 may be distributively deployed on a plurality of servers in the cloud data center, or distributively deployed on a plurality of virtual machines in the cloud data center, or distributively deployed on the servers and the virtual machines in the cloud data center. As shown in FIG. 2, the AI platform 100 is abstracted by the cloud service provider from a cloud service platform into an AI cloud service and provided to a user, and after the user purchases the cloud service on the cloud service platform (pre-recharging may be performed and then settlement is performed based on final usage of the resource), the cloud environment provides an AI platform cloud service for the user by using the AI platform 100 deployed in the cloud data center. When using the AI platform cloud service, the user may determine, by using an application programming interface (API) or a GUI, a task to be completed by an AI model, and upload a training image set and an unlabeled image set to the cloud environment. The AI platform 100 in the cloud environment receives task information, the training image set, and the unlabeled image set of the user, performs data preprocessing and AI model training, performs inference on an unlabeled image in the unlabeled image set by using the trained AI model, and performs operations such as hard example mining to determine a hard example and a hard example attribute, and retraining of the AI model based on the mined hard example. The AI platform returns content such as a mined hard example and hard example attribute to the user by using the API or the GUI. The user further chooses whether to retrain the AI model based on the hard example. The trained AI model may be downloaded or used online by the user to complete a specific task.

In another embodiment of this application, when the AI platform 100 in the cloud environment is abstracted into an AI cloud service and provided for the user, the AI cloud service may be divided into two parts: a basic AI cloud service and an AI hard example mining cloud service. The user may first purchase only the basic AI cloud service on the cloud service platform, and then purchase the AI hard example mining cloud service when needing to use the AI hard example mining cloud service. After purchase, the cloud service provider provides an AI hard example mining cloud service API, and finally, additional charging is performed on the AI hard example mining cloud service based on a quantity of times of invoking the API.

Figure 3:
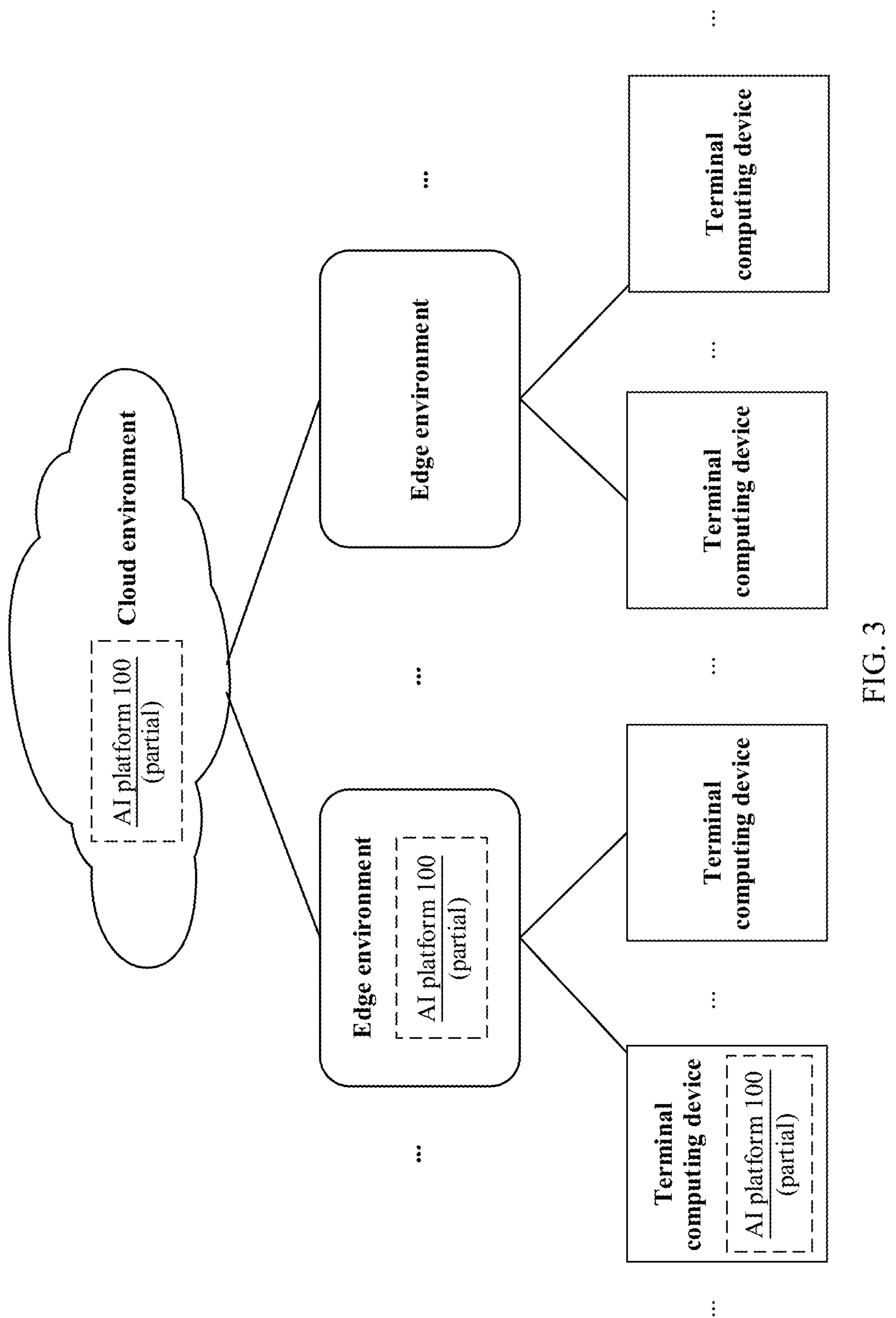
FIG. 3 is a schematic diagram of deploying an AI platform 100 according to an embodiment of this application.

Deployment of the AI platform 100 provided in this application is flexible. As shown in FIG. 3, in another embodiment, the AI platform 100 provided in this application may be alternatively distributively deployed in different environments. The AI platform 100 provided in this application may be logically divided into a plurality of parts, and each part has a different function. For example, in an embodiment, the AI platform 100 includes a user I/O module 101, a hard example mining module 102, a model training module 103, an AI model storage module 106, and a data storage module 106. Each part in the AI platform 100 may be separately deployed in any two or three environments of a terminal computing device, an edge environment, and a cloud environment. The terminal computing device includes a terminal server, a smartphone, a notebook computer, a tablet computer, a personal desktop computer, an intelligent camera, and the like. The edge environment is an environment that includes an edge computing device set that is relatively close to the terminal computing device, and the edge computing device includes an edge server, an edge small cell having a computing capability, and the like. Various parts of the AI platform 100 that are deployed in different environments or devices cooperate to provide a user with functions such as determining and training a constructed AI model. For example, in a scenario, the user I/O module 101, the data storage module 106, and the data preprocessing module 107 in the AI platform 100 are deployed in the terminal computing device, and the hard example mining module 102, the model training module 103, the inference module 104, and the AI model storage module 106 in the AI platform 100 are deployed in the edge computing device of the edge environment. The user sends the training image set and the unlabeled image set to the user I/O module 101 in the terminal computing device, and the terminal computing device stores the training image set and the unlabeled image set in the data storage module 106. The data preprocessing module 102 preprocesses a training image in the training image set and an unlabeled image in the unlabeled image set, and also stores the preprocessed training image in the training image set and the preprocessed unlabeled image in the unlabeled image set in the data storage module 106. The model training module 103 in the edge computing device determines a constructed AI model based on a task target of the user, performs training based on the constructed AI model and the training image in the training image set to obtain an initial AI model, and further performs training based on a hard example in unlabeled images in the training image set and the initial AI model to obtain an optimized initial AI model. Optionally, the hard example mining module 102 may further mine, based on the optimized AI model, a hard example and a hard example attribute included in the unlabeled image set. The model training module 103 trains the optimized AI model based on the hard example provided by the user I/O module 101, to obtain a more optimized AI model. It should be understood that, in this application, a specific environment in which parts of the AI platform 100 are deployed is not limited. In actual application, adaptive deployment may be performed based on a computing capability of the terminal computing device, a resource occupation status of the edge environment and the cloud environment, or a specific application requirement.

Figure 4:
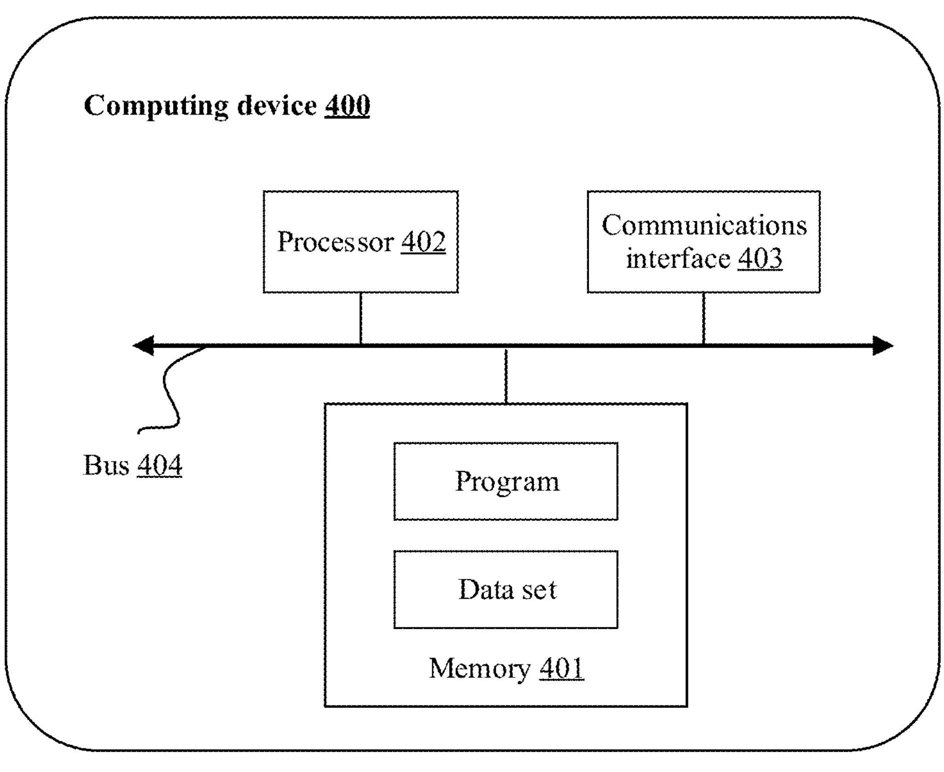
FIG. 4 is a schematic diagram of a structure of a computing device 400 on which an AI platform 100 is deployed according to an embodiment of this application.

Alternatively, the AI platform 100 may be independently deployed on a computing device in any environment (for example, independently deployed on an edge server in an edge environment). FIG. 4 is a schematic diagram of a hardware structure of a computing device 400 on which the AI platform 100 is deployed. The computing device 400 shown in FIG. 4 includes a memory 401, a processor 402, a communications interface 403, and a bus 404. The memory 401, the processor 402, and the communications interface 403 implement a communication connection to each other by using the bus 404.

The memory 401 may be a read-only memory (ROM), a random access memory (RAM), a hard disk, a flash memory, or any combination thereof. The memory 401 may store a program. When the program stored in the memory 401 is executed by the processor 402, the processor 402 and the communications interface 403 are configured to perform a method in which the AI platform 100 trains an AI model for a user, mines a hard example and a hard example attribute, and further optimizes the AI model based on the hard example. The memory may further store an image set. For example, some storage resources in the memory 401 are classified into a data storage module 106, configured to store data required by the AI platform 100, and some storage resources in the memory 401 are classified into an AI model storage module 106, configured to store an AI model library.

The processor 402 may be a central processing unit (CPU), an application-specific integrated circuit (ASIC), a graphics processing unit (GPU), or any combination thereof. The processor 402 may include one or more chips. The processor 402 may include an AI accelerator, such as a neural network processing unit (NPU).

The communications interface 403 uses a transceiver module such as a transceiver, to implement communication between the computing device 400 and another device or a communications network. For example, data may be obtained by using the communications interface 403.

The bus 404 may include a path that transmits information between the parts of the computing device 400 (for example, the memory 401, the processor 402, and the communications interface 403).

With development of an AI technology, the AI technology is widely used in numerous fields. For example, the AI technology is applied to the fields of autonomous driving and assisted driving of vehicles, and is specifically used to perform processing such as lane line recognition, traffic light recognition, automatic parking space recognition, and sidewalk detection. In summary, the foregoing processing may be considered as using an AI model in an AI platform to perform image classification and/or target detection. For example, the AI model is used to determine traffic light recognition, and the AI model is used to recognize a lane line. Image classification is mainly used to determine a category to which an image belongs (to be specific, a frame of image is input and a category to which the image belongs is output). Target detection may include two aspects. In one aspect, target detection is used to determine whether a target belonging to a particular category appears in an image, and in the other aspect, target detection is used to position the target (that is, a position at which the target appears in the image is determined). Before application such as image classification or target detection is performed, an initial AI model usually needs to be trained based on a training image with a label in a specific application scenario, so that a trained AI model has a capability of performing image classification or target detection in the specific application scenario. In embodiments of this application, image classification and target detection are used as examples to describe how to perform data labeling in the AI platform, so that data labeling efficiency can be improved.

Figure 5:
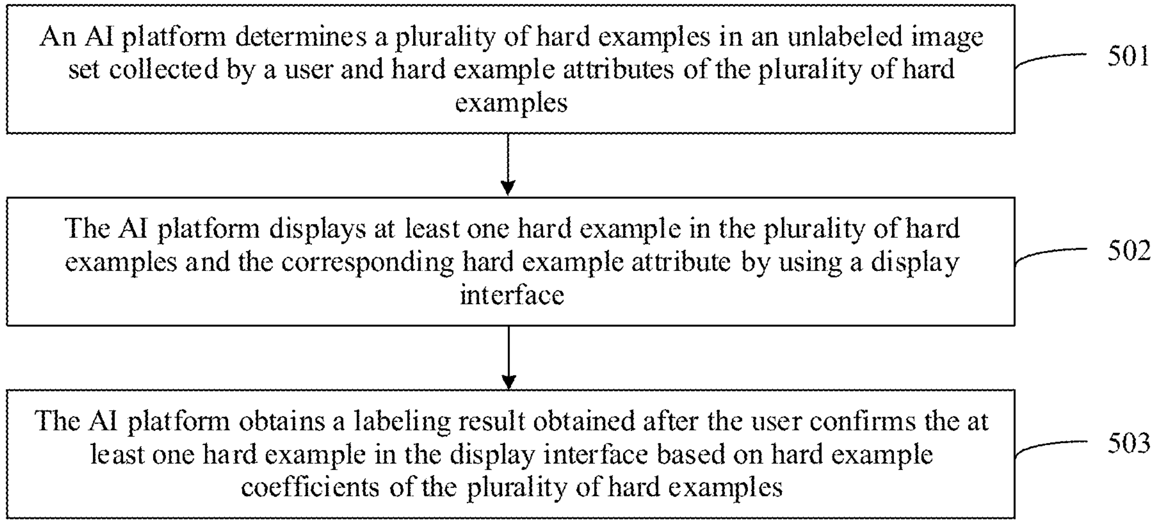
FIG. 5 is a schematic flowchart of a data labeling method according to an embodiment of this application.

The following describes a specific procedure of a data labeling method with reference to FIG. 5. Description is provided by using an example in which the method is performed by an AI platform.

Step 501: The AI platform determines a plurality of hard examples in an unlabeled image set collected by a user and hard example attributes of the plurality of hard examples.

The user is a physical user who registers an account on the AI platform, for example, an AI model developer. The unlabeled image set includes a plurality of unlabeled images. The hard example attribute includes a hard example coefficient, which is a number between 0 and 1, and is used to reflect a hard example degree of the hard example (for example, a difficulty of obtaining a correct result by performing classification or detection by using an AI model). A larger hard example coefficient indicates a higher hard example degree. Conversely, a smaller hard example coefficient indicates a lower hard example degree.

In this embodiment, the user may place the images of the unlabeled image set in a folder, and then open an image upload interface provided by the AI platform. The upload interface includes an input location of an image. The user may add a storage location of the unlabeled image set at the input location, and upload the plurality of unlabeled images in the unlabeled image set to the AI platform. In this way, the AI platform can obtain the unlabeled image set. As shown in FIG. 6, the upload interface further displays an identifier (used to mark an image uploaded at this time), a label type (used to indicate a purpose of the AI model trained by using an image, such as target detection or image classification), a creation time, an image input location, an image label set (such as a person or a vehicle), a name (such as a target or an object), a version name (the version name of the AI model), whether the image is labeled by a team (If “no” is shown, it indicates that the image is labeled only by the user uploading the unlabeled image, or if “yes” is shown, it indicates that the image may be labeled by a member of a team including the user who uploads the unlabeled image), and the like.

The AI platform may obtain a current AI model, and the current AI model may be an AI model in a semi-training state that has been trained by using an image with a label but still needs to be trained. Then, the plurality of images in the unlabeled image set are input to the AI model, to obtain an inference result of the plurality of unlabeled images. Herein, if the AI model is used for image classification, the inference result of the image is a category to which the image belongs. For example, if the image is an image of an apple, the category to which the image belongs is apple. If the AI model is used for target detection, the inference result of the image is a location of a bounding box of a target included in the image and a category to which the target belongs. The target may be an object included in the image, such as a vehicle, a person, or a cat. If the AI model is used for both image classification and target detection, the inference result of the image is a category to which the image belongs, a location of a bounding box of a target included in the image, and a category to which the target belongs.

The AI platform determines, based on the inference result, the hard examples in the unlabeled image set and the hard example attributes of the hard examples. The hard example attribute includes a hard example coefficient, and the hard example coefficient is used to describe a hard example degree. Specifically, the AI platform may determine the hard examples in the unlabeled image set and the hard example attributes of the hard examples by using one or more of a time sequence consistency algorithm, a data feature distribution algorithm, a data enhancement consistency algorithm, a non-deterministic algorithm, a clustering algorithm, and an anomaly detection algorithm. When the AI platform uses a plurality of algorithms to determine the hard examples and the hard example attributes, different algorithms have different weights, and different features also have different weights.

Step 502: The AI platform displays at least one hard example in the plurality of hard examples and the corresponding hard example attribute by using a display interface.

In this embodiment, after obtaining the hard examples, the AI platform may provide the plurality of hard examples for the user by using the display interface, and the user may control the display interface to display the at least one hard example in the plurality of hard examples and the corresponding hard example attribute.

Optionally, for a hard example, the hard example attribute may be displayed at any location of the hard example. For example, in a scenario of target recognition, a hard example coefficient in the hard example attribute may be displayed in an upper right corner or a lower right corner of a target box of the target.

Step 503: The AI platform obtains a labeling result obtained after the user confirms the at least one hard example in the display interface based on hard example coefficients of the plurality of hard examples.

In this embodiment, the user may confirm, in the display interface, a label that is of the hard example and that is provided by the AI platform (specifically including direct confirmation, confirmation after modification, and the like). The AI platform may obtain the labeling result obtained after labeling confirmation is performed on the at least one hard example. Specifically, for hard examples in different scenarios, the labeling result includes different content. For example, in a scenario of image classification, the labeling result of the hard example includes a correct category to which the image belongs. In a scenario of target prediction, the labeling result of the hard example includes a location and a category of a target in the image.

In this way, because the AI platform can provide a hard example for the user, the user only needs to perform labeling confirmation on the hard example, and does not need to label a large quantity of unlabeled images, so that labeling efficiency can be improved, and efficiency of optimizing an AI model can be further improved. In addition, the user is further provided with a hard example attribute, so that the user better understands the hard example, and labeling efficiency is further improved.

In a possible implementation, the hard example attribute further includes a hard example reason. The hard example reason may include a plurality of types, which may be roughly classified into data enhancement inconsistency, data feature distribution inconsistency, another reason, and the like.

The data enhancement inconsistency is used to indicate that after some processing is performed on the unlabeled image, the inference result is inconsistent with that when the unlabeled image is not processed. These processing operations may include one or more of cropping, scaling, sharpening, flipping (horizontal and/or vertical flipping), translation, Gaussian noise addition, and shearing, which are only examples herein. Alternatively, another processing may be performed. This is not limited in this embodiment of this application. For example, after a part of the image is cropped, the inference result is different from that before the cropping, and this case is image cropping enhancement inconsistency.

The data feature distribution inconsistency is used to indicate that a feature of the unlabeled image is inconsistent with a feature of the training image used for training the AI model, and may specifically include one or more of inconsistencies between resolution of the unlabeled image and resolution of the training image, between a size of the unlabeled image and a size of the training image, between brightness of the unlabeled image and brightness of the training image, between definition of the unlabeled image and definition of the training image, between color saturation of the unlabeled image and color saturation of the training image, and between a feature of a target box of the unlabeled image and a feature of a target box of the training image. The feature of the target box may include a quantity of target boxes, an area of the target box, a stacking degree of the target box, and the like. This is merely an example, and another example may be used. This is not limited in this embodiment of this application. For example, the training image is an image shot in the daytime, and some images in the unlabeled image set are images shot at night. This case is data feature distribution (brightness feature) inconsistency.

Other reasons may include time sequence inconsistency, similar image inconsistency, and the like. The time sequence inconsistency means inconsistency between inference results of a plurality of successive similar images. For example, in a video, the first image and the third image in three adjacent images each include three target boxes, and the second image includes two target images. This indicates that the second image is a hard example, and a hard example reason is that time sequences of successive images are inconsistent. The similar image inconsistency means that the inference result of the unlabeled image is greatly different from the inference result of a same type of image in training images.

The hard example reason in the hard example attribute may be displayed on a side of the hard example, for example, on a right side of the hard example.

In this way, because the hard example reason is displayed, the user can know why the image is a hard example, so that the user takes corresponding measures to reduce hard examples. For example, the hard example reason of a hard example is that image brightness does not conform to distribution, and the user may add an image whose brightness is the same as or similar to that of the hard example to the training images.

In a possible implementation, the AI platform displays, by using a display interface, suggestion information corresponding to the hard example reason of the at least one hard example.

The suggestion information is used to reflect a processing manner that can be performed to reduce hard examples with corresponding hard example reasons. For example, if the hard example reason of a hard example is that successive images are inconsistent, the corresponding suggestion information is "re-label and add an image similar to the hard example." If the hard example reason of a hard example is image cropping enhancement, it indicates that a generalization capability of the AI model for the hard example is not sufficiently strong, and the suggestion information is "re-label and crop the hard example", to enhance the generalization capability of the AI model. If the hard example reason of a hard example is that brightness of the hard example does not conform to brightness distribution of the training images, it indicates a high probability that the AI model does not learn an image with the brightness of the hard example, and the suggestion information is "re-label and add an image with this brightness", so that the generalization capability of the model is stronger.

In this embodiment, the AI platform may further display, by using the display interface, the suggestion information corresponding to the hard example reason of the at least one hard example, and the hard example reason is displayed corresponding to the suggestion information. In this way, more intuitive suggestion information is provided for the user, so that the user takes corresponding measures, and a trained AI model can be more accurate.

Optionally, the hard example reason and the suggestion information may be displayed on a side of the hard example, for example, on a right side of the hard example.

In a possible implementation, the hard example attribute further includes a hard example type. In a target recognition scenario, the hard example type may reflect a type of a target box, and the hard example type may be represented by using 1, 2, or 3, where 1 indicates that the target box is a normal box, and the AI platform learns through analysis that the box is a correctly predicted box with a high probability. 2 indicates that the target box is an error detection box, and the AI platform learns through analysis that there may be an error in a location or a label of the box, and the user needs to pay special attention during adjustment. 3 indicates that the target box is a missed detection box, and the AI platform learns through analysis that the box may not be detected by the model, and the user needs to pay special attention during adjustment.

Optionally, some images in some open-source data sets already have original labels. In this embodiment, a hard example may be further mined from an image with an original label. In this case, if the original label of the hard example is incorrect, the hard example type may be alternatively represented by using 0, where 0 indicates that the original label is incorrect.

Optionally, when the hard example type is displayed and when the AI platform displays the hard example, different hard example types correspond to different display colors or different hard example types correspond to different display lines. For example, red represents an error detection box, yellow represents a missed detection box, and blue represents a normal box.

In a possible implementation, when the AI platform displays the hard examples by using the display interface, the user may filter some hard examples for display, or the user controls the hard examples to be displayed in a specific order, and processing is as follows:

The AI platform obtains a hard example coefficient filtering range and/or display order selected by the user in the display interface; and displays the at least one hard example and the corresponding hard example attribute by using the display interface based on the hard example coefficient filtering range and/or display order.

In this embodiment, the hard example display interface provided by the AI platform includes a sorting option, a hard example coefficient selection option, and the like. The sorting option is used by the user to control a display order of the hard examples, and the hard example coefficient selection option is used by the user to filter some hard examples based on the hard example coefficients for display. The user may select a display order in an option bar corresponding to the sorting option, and the display order includes a descending order of the hard example coefficients, an ascending order of the hard example coefficients, and the like. The hard example coefficient selection option is represented by using a slider bar. The user may drag a slider on the slider bar to select the filtering range. The hard example coefficient selection option may be alternatively represented by using a hard example coefficient range input box. After detecting selection of the user, the AI platform may display, by using the display interface, hard examples and hard example attributes corresponding to the hard example coefficient filtering range and/or display order.

In addition, when the user selects the descending order of the hard example coefficients, prompt information "if the descending order of the hard examples coefficients is selected for labeling, it indicates that data that is incorrectly predicted by the model is first labeled, and the user needs to adjust a large amount of data, but most of the data is not identified by the AI model in the previous round, and first labeling the data can speed up AI model iteration and rapidly improve accuracy of the AI model" is further displayed. When the user selects the ascending order of the hard example coefficients, prompt information "if the ascending order of the hard examples coefficients is selected for labeling, most of the data can be identified by the AI model in the previous round, the user adjusts a small amount in the data, but an iteration speed of the AI model is low" is further displayed.

In addition, the AI platform may further prompt "the user may selectively label hard examples or non-hard examples based on current energy (the non-hard example is data that can be correctly predicted by the AI model with a high probability, and a modification amount of labeling the data is small), or select, based on a hard example coefficient, a hard example that needs to be labeled currently".

In a possible implementation, the AI platform may further display statistical information of the plurality of hard examples, and processing may be as follows:

When the at least one hard example is a plurality of hard examples, the AI platform displays, by using the display interface, statistical information corresponding to the unlabeled image set, where the statistical information includes one or more of distribution information of non-hard examples and hard examples in the unlabeled image set, hard example distribution information of various hard example reasons in the unlabeled image set, hard example distribution information of various hard example coefficient ranges in the unlabeled image set, and hard example distribution information of various hard example types in the unlabeled image set.

In this embodiment, when displaying the plurality of hard examples in the unlabeled image set, the AI platform may determine the statistical information corresponding to the unlabeled image set. Specifically, the AI platform may determine distribution information of non-hard examples and hard examples in the unlabeled image set, may determine hard example distribution information of various hard example reasons in the unlabeled image set, and may further determine hard example distribution information of various hard example coefficient ranges in the unlabeled image set. The hard example coefficient ranges may be preset, for example, the hard example coefficient ranges include 0 to 0.3, 0.3 to 0.6, and 0.6 to 1. In addition, the AI platform may further determine hard example distribution information of various hard example types in the unlabeled image set.

The AI platform may display the determined statistical information by using the display interface. In this way, because the statistical information includes the distribution information of the non-hard examples and the hard examples in the unlabeled image set, the user may see a ratio of the hard examples to the unlabeled image set, and may further determine whether inference performance of the AI model meets a requirement. A smaller ratio of the hard examples to the unlabeled image set indicates better inference performance of the AI model. Because the statistical information includes the hard example distribution information of various hard example reasons in the unlabeled image set, when there are a large quantity of images with some hard example reasons, the user may focus on adding images with these hard example reasons, to quickly optimize the AI model. Because the statistic information includes hard example distribution information of various hard example coefficient ranges in the unlabeled image set, the user can learn a hard example distribution status. Because the statistic information includes hard example distribution information of various hard example types in the unlabeled image set, the user can learn a distribution status of the hard examples in the unlabeled image set in terms of the hard example type.

In a possible implementation, in step 502, processing is as follows: The AI platform determines a plurality of hard examples in an unlabeled image set collected by a user and hard example attributes of the plurality of hard examples according to a hard example mining algorithm.

In this embodiment, the hard example mining algorithm includes one or more of a time sequence consistency algorithm, a data feature distribution algorithm, a data enhancement consistency algorithm, a non-deterministic algorithm, a clustering algorithm, and an anomaly detection algorithm. The AI platform may input the inference result of the unlabeled image to the hard example mining algorithm, to obtain the plurality of hard examples in the unlabeled image set and the hard example attributes of the plurality of hard examples.

In a possible implementation, after obtaining the labeling result obtained after the user confirms the hard example, the AI platform may update the hard example mining algorithm, and processing is as follows:

In the labeling result provided by the user, if a target hard example in the at least one hard example is confirmed as a correct hard example, the AI platform increases the weight corresponding to the hard example reason of the target hard example; or in the labeling result, if the target hard example is confirmed as an incorrect hard example, the AI platform decreases the weight corresponding to the hard example reason of the target hard example; and updates the hard example mining algorithm based on updated weights and the labeling result.

The correct hard example is a hard example that is in hard examples mined by using the hard example mining algorithm and that is considered by the user as a hard example. The incorrect hard example is a hard example that is in hard examples mined by using the hard example mining algorithm and that is considered by the user as a non-hard example.

In this embodiment, after obtaining the labeling result provided by the user, the AI platform may obtain a weight corresponding to the hard example reason of the at least one hard example in the hard example mining algorithm. If a target hard example in the at least one hard example is confirmed as a correct hard example, the AI platform may increase the weight corresponding to the hard example reason of the target hard example. The weight is a weight of the hard example reason in the hard example mining algorithm. If a target hard example in the at least one hard example is confirmed as an incorrect hard example, the AI platform may decrease the weight corresponding to the hard example reason of the target hard example, and the weight is a weight of the hard example reason in the hard example mining algorithm.

Then, the AI platform updates the hard example mining algorithm by using the labeling result provided by the user and the updated weights of the hard example reasons. In this way, because the weights of the hard example reasons are adjusted, the hard examples mined by using the updated hard example mining algorithm can be more accurate, reducing a labeling amount.

In addition, in this embodiment, a hard example on which the user performs labeling confirmation may be further used to update the AI model, and optimize the AI model, so that the inference result provided by the AI model is more accurate.

In addition, in this embodiment, after the user performs labeling confirmation on the hard examples, the hard examples on which labeling confirmation is performed are synchronized to a labeled image set. In addition, the AI platform may further convert, based on the labeling confirmation of the user, a hard example set to be confirmed by the user into a labeled hard example set, or a labeled non-hard example set, or an unlabeled hard example set, or an unlabeled non-hard example set. For example, if an image has labeling information, and one of target boxes is confirmed by the user as a missed detection box or an error detection frame, the AI platform stores the image in the labeled hard example set.

Figure 7:
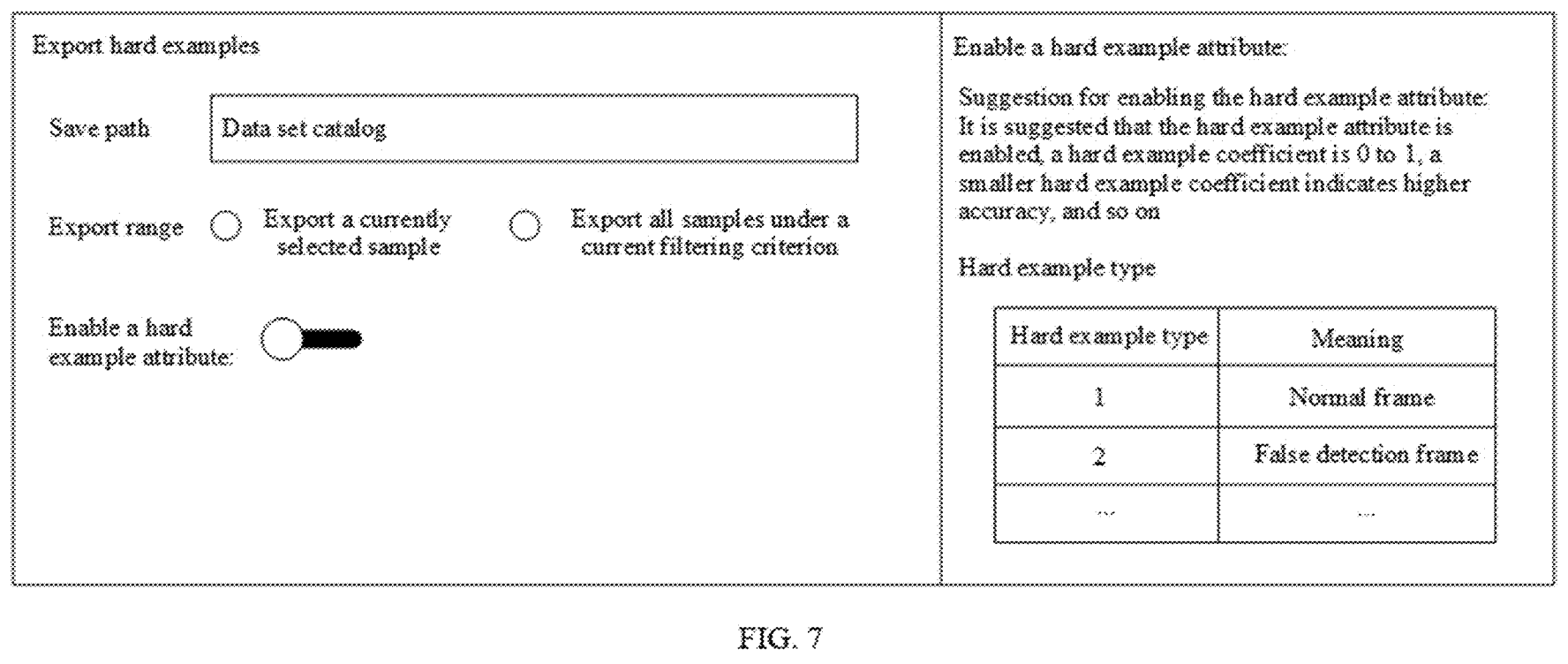

In addition, in this embodiment, the AI platform further provides processing of exporting the hard examples and the hard example attributes. The user may select a save path of hard examples and hard example attributes in a hard example export interface, to export hard examples and hard example attributes. As shown in FIG. 7, the hard example export interface includes the save path and an export range (which may include exporting a currently selected sample (that is, a selected hard example) and exporting all samples under a current filtering criterion). In addition, the hard example export interface further includes a hard example attribute enable option. If the hard example attribute enable option is selected, the hard example attribute is also exported when the hard example is exported. If the hard example attribute enable option is not selected, the hard example attribute is not exported when the hard example is exported. In addition, a suggestion for enabling the hard example attribute further corresponds to enabling the hard example attribute: It is suggested that the hard example attribute is enabled, the hard example coefficient is 0 to 1, a smaller hard example coefficient indicates higher accuracy, and so on. In addition, a hard example type is further provided corresponding to enabling the hard example attribute.

In addition, in a possible implementation, in step 501, the current AI model may be an initial AI model, the AI platform may provide a labeling selection interface for the user, the labeling selection interface includes at least one labeling manner that can be selected by the user, and the AI platform may receive a labeling manner selected by the user. The initial AI model corresponding to the labeling manner is used to determine an inference result of the unlabeled image set. Specifically, as shown in FIG. 8, a plurality of labeling manners provided in the labeling selection interface may include an active learning manner and a pre-labeling manner. Processing performed by the AI platform in the active learning manner is as follows: The AI platform first trains a constructed AI model by using a plurality of images with labels provided by the user, to obtain an initial AI model. Then, the unlabeled image set is labeled based on the initial AI model, to obtain an inference result of the unlabeled image set. Processing performed by the AI platform in the pre-labeling manner is as follows: The AI platform directly obtains the existing initial AI model, labels the unlabeled image set based on the initial AI model, and obtains the inference result of the unlabeled image set. In addition, the labeling selection interface further displays a quantity of all images, a quantity of unlabeled images, a quantity of images with labels, and a to-be-confirmed quantity (the to-be-confirmed quantity is a quantity of hard examples to be confirmed by the user). The plurality of images with labels provided by the user may be labeled by the user by using the AI platform, and the plurality of images are selected by the AI platform by using a data selection algorithm from unlabeled images uploaded by the user. To be specific, when the user chooses to personally label an unlabeled image, the user may determine whether the AI model to be trained by the user is used in a scenario of image classification, a scenario of target detection, or a scenario of a combination of image classification and target detection. If the AI model to be trained is applied to the scenario of image classification, an image labeling interface that is of the scenario of image classification and that is provided by the AI platform is started. If the AI model to be trained is applied to the scenario of target detection, an image labeling interface that is of the scenario of target detection and that is provided by the AI platform is started. Options such as image selection, bounding box, back key, image zoom-in, and image zoom-out are provided in the image labeling interface of the scenario of target detection, and the user may open a frame of image by selecting an image option. Then, in the image, a target is labeled by using the bounding box and a label is added to the target. The label may include a category of the target in the bounding box and a location of the bounding box in the image (because the bounding box is usually rectangular, the location may be identified by using location coordinates in an upper left corner and a lower right corner). After the user labels the target by using the bounding box, the AI platform obtains the bounding box of the target. The image labeling interface may further display a labeling information bar of the image. The labeling information bar displays information about the target labeled by the user, including a label, a bounding box, and an operation. The label is used to indicate a category to which the target belongs, the bounding box is used to indicate a shape of a used box, and the operation includes deletion and modification options. The user may modify, by performing the operation, the label already added to the image.

To better understand this embodiment of this application, this embodiment of this application provides a schematic diagram of displaying a plurality of hard examples by the AI platform by using the display interface.

Figure 9:
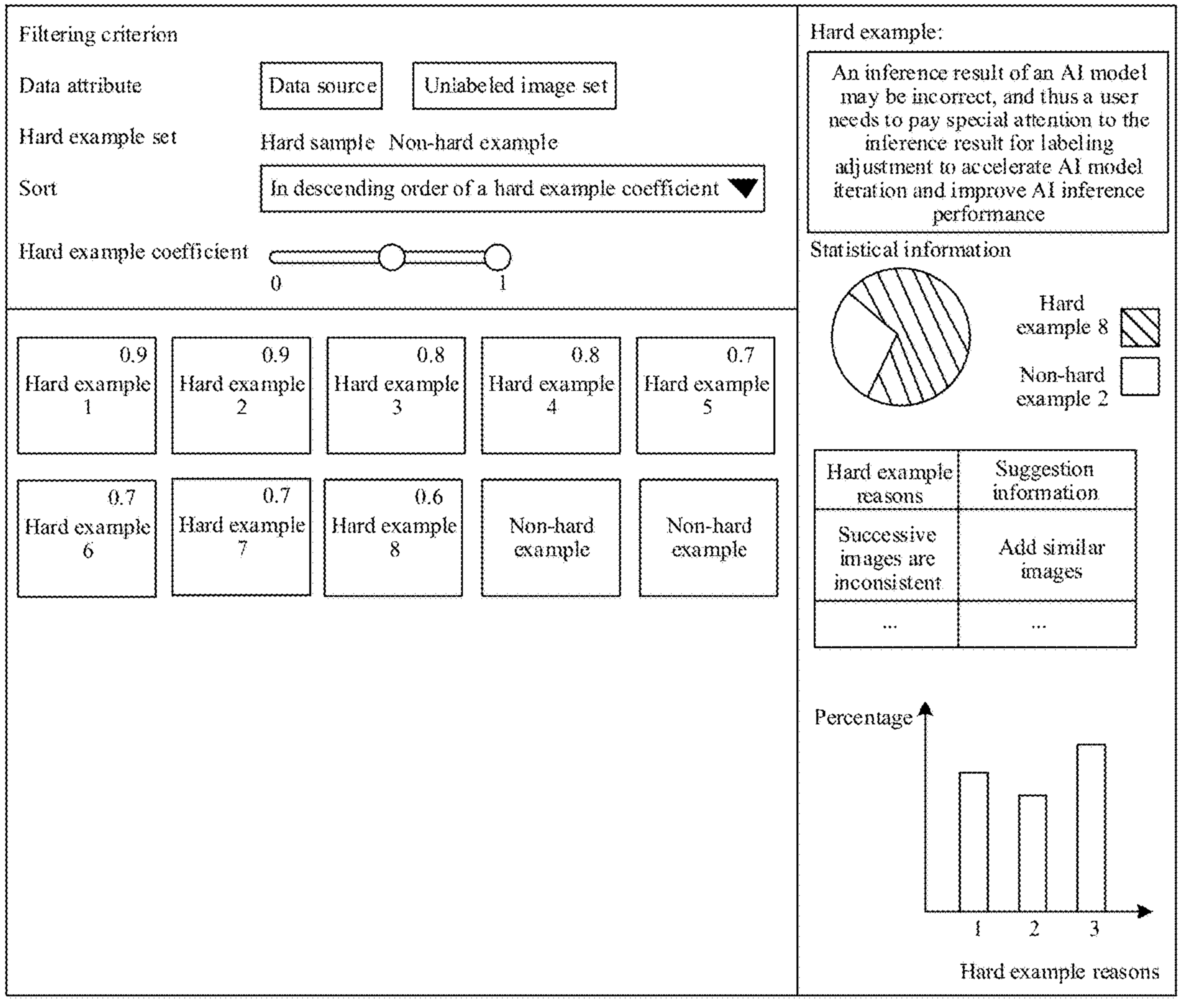
FIG. 9 is a schematic diagram of a display interface of a plurality of hard examples according to an embodiment of this application.

As shown in FIG. 9 (in the figure, 0.8, 0.9, and the like represent hard example coefficients), the display interface displays a filtering criterion and content corresponding to the filtering criterion. The specific filtering criterion may include a data attribute, a hard example set, sorting, and a hard example coefficient. When the filtering criterion is the hard example, a hard example is displayed below the filtering criterion, and a hard example coefficient of each hard example is displayed. A definition of the hard example and the statistical information of the unlabeled image set are displayed on the right of the filtering criterion. The statistical information includes the distribution information of hard examples and non-hard examples in the unlabeled image set, distribution information of hard examples with various hard example reasons, hard example reasons, and corresponding suggestion information. The hard example reasons and the suggestion information may be indicated by using a table, but this application is not limited to this manner. The distribution information of hard examples with various hard example reasons is indicated by using a histogram, but this application is not limited to this manner. The distribution information of hard examples and non-hard examples in the unlabeled image set is indicated by using a pie chart, but this application is not limited to this manner.

In addition, to better understand this embodiment of this application, this embodiment of this application provides a schematic diagram of displaying a hard example by the AI platform by using the display interface.

As shown in FIG. 10, the display interface displays a hard example on which the user currently needs to perform labeling confirmation, and displays a hard example type, a hard example coefficient, a hard example reason, and suggestion information corresponding to the hard example. In addition, the display interface further displays an operation of labeling confirmation corresponding to each target box. If the label is "person" and the labeled box is a square box, there are two operations: deletion ad modification.

In addition, in FIG. 10, to help the user select a hard example for labeling confirmation, a plurality of hard examples are displayed below the hard example on which labeling confirmation is currently performed, and the user may directly tap the hard example displayed below to switch the hard example.

Figure 11:
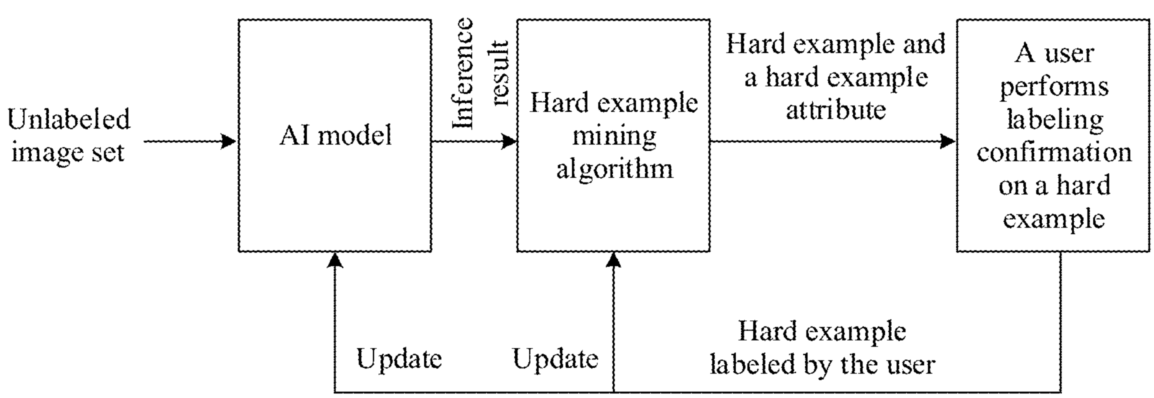
FIG. 11 is a schematic flowchart of a data labeling method according to an embodiment of this application.

In addition, in this application, to better understand this embodiment, a flow block diagram shown in FIG. 11 is further provided.

First, an AI model is obtained. The AI model may be a trained model, or may be obtained through training based on labeled images after the user labels some data without labels. The AI model performs inference on an unlabeled image set, and obtains an inference result of the unlabeled image set. An AI platform uses a hard example mining algorithm to determine hard examples and hard example attributes in the unlabeled image set. The AI platform provides the hard examples and the hard example attributes for a user. The user performs labeling confirmation on the hard examples. The hard example mining algorithm and the AI model are updated based on a labeling result obtained after the user performs labeling confirmation.

In this embodiment of this application, the hard example attribute is used to enable the user to understand hard example data, and a targeted suggestion is provided. This reduces labeling costs and can improve inference performance of the AI model. In addition, in this application, behavior of the AI platform and the user forms a human-computer interaction system. The AI platform determines an inference result of the unlabeled image set, and the hard example mining algorithm in the AI platform determines the hard examples and the hard example attributes in the unlabeled image set, and provides the hard examples and the hard example attributes in the unlabeled image set for the user. The AI platform guides the user in performing labeling confirmation on the hard examples. The AI platform updates the hard example mining algorithm and the AI model by using the labeling result fed back by the user.

It should be noted that, the data labeling method provided above may be implemented jointly by one or more modules on the AI platform 100. Specifically, a hard example mining module is configured to implement step 502 in FIG. 5. A user I/O module is configured to: implement step 502 and step 503 in FIG. 5, and implement the foregoing content about displaying statistical information. A model training module is configured to implement the foregoing updating processing on the hard example mining algorithm.

Figure 12:
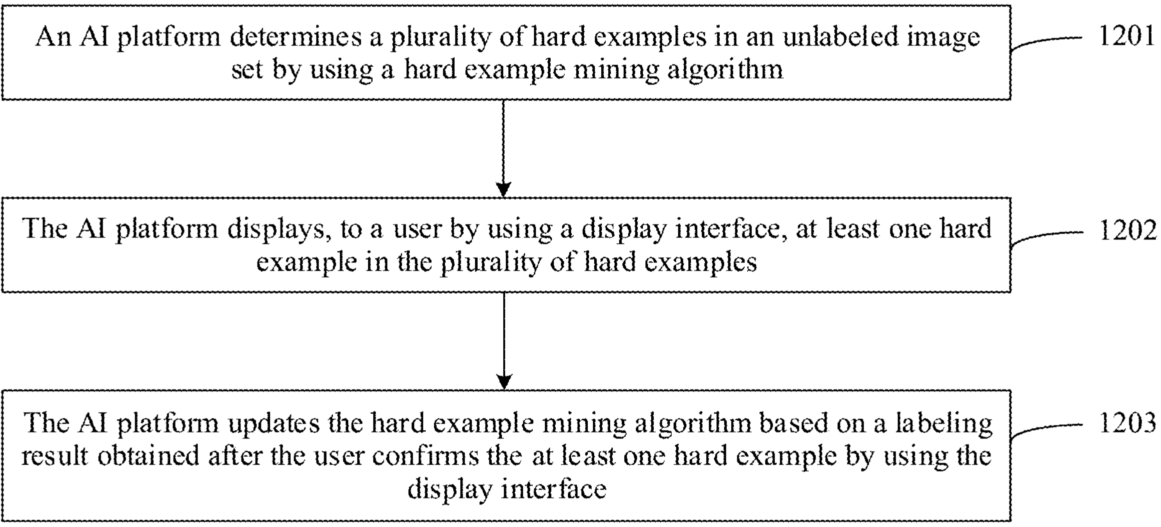
FIG. 12 is a schematic flowchart of a method for updating a hard example mining algorithm according to an embodiment of this application.

Another embodiment of this application, as shown in FIG. 12, provides a method for updating a hard example mining algorithm. A procedure of the method is as follows:

Step 1201: An AI platform determines a plurality of hard examples in an unlabeled image set by using a hard example mining algorithm.

Step 1202: The AI platform displays, to a user by using a display interface, at least one hard example in the plurality of hard examples.

Refer to the foregoing descriptions for step 1201 and step 1202. Details are not described herein again.

Step 1203: The AI platform updates the hard example mining algorithm based on a labeling result obtained after the user confirms the at least one hard example by using the display interface.

In this embodiment, after obtaining the labeling result obtained after the user confirms the at least one hard example by using the display interface, the AI platform may update the hard example mining algorithm based on the labeling result, so that accuracy of hard example prediction is increasingly high.

Specifically, step 1201 may be performed by the hard example mining module described above, step 1202 may be performed by the user I/O module described above, and step 1203 may be performed by the model training module.

In a possible implementation, processing of step 1203 may be as follows:

The AI platform obtains a weight for a hard example reason of each hard example in the at least one hard example; analyzes the labeling result, and if a target hard example in the at least one hard example is confirmed by the user as a correct hard example, increases the weight corresponding to the hard example reason of the target hard example; or in the labeling result, if the target hard example is confirmed by the user as an incorrect hard example, decreases the weight corresponding to the hard example reason of the target hard example; and updates the hard example mining algorithm based on updated weights.

Refer to the foregoing descriptions for this processing procedure. Details are not described herein again.

In a possible implementation, the AI platform determines hard example reasons of the plurality of hard examples by using the hard example mining algorithm, and provides suggestion information corresponding to the hard example reasons for the user by using the display interface, where the suggestion information indicates a processing manner that can be performed to reduce hard examples with corresponding hard example reasons.

In a possible implementation, the AI platform displays a hard example attribute corresponding to the at least one hard example by using the display interface, where the hard example attribute includes one or more of a hard example coefficient, a hard example reason, and a hard example type.

Content such as how to display a hard example and a hard example attribute is already described above. Refer to the foregoing descriptions. Details are not described herein again.

Figure 13:
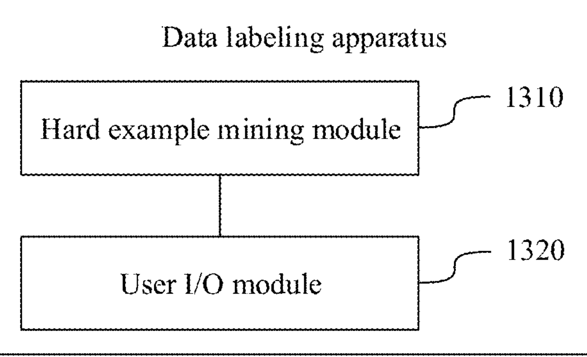
FIG. 13 is a schematic diagram of a structure of a data labeling apparatus according to an embodiment of this application.

FIG. 13 is a diagram of a structure of a data labeling apparatus according to an embodiment of this application. The apparatus may be implemented as a part of the AI platform or the entire AI platform by using software, hardware, or a combination thereof. The data labeling apparatus provided in this embodiment of this application may implement the procedure shown in FIG. 5 of embodiments of this application. The apparatus includes a hard example mining module 1310 and a user I/O module 1320.

The hard example mining module 1310 is configured to determine a plurality of hard examples in an unlabeled image set and hard example attributes of the plurality of hard examples, where the hard example attribute includes a hard example coefficient, and the hard example mining module 1310 may be specifically configured to: implement the hard example mining function in step 501 and perform an implicit step included in step 501.

The user I/O module 1320 is configured to:

display, to the user by using the display interface, the at least one hard example in the plurality of hard examples and the hard example attribute corresponding to the at least one hard example; and obtain a labeling result obtained after the user confirms the at least one hard example in the display interface based on hard example coefficients of the plurality of hard examples, where the user I/O module 1320 may be specifically configured to: implement the user I/O function in step 502 and step 503 and perform implicit steps included in step 502 and step 503.

In a possible implementation, the hard example attribute further includes a hard example reason; and the user I/O module 1320 is further configured to:

display, by using the display interface, a hard example reason corresponding to the at least one hard example and suggestion information corresponding to the hard example reason, where the suggestion information indicates a processing manner that can be performed to reduce hard examples with corresponding hard example reasons.

In a possible implementation, the hard example attribute further includes a hard example type, and the hard example type includes error detection, missed detection, or normal prediction.

In a possible implementation, the user I/O module 1320 is further configured to:

display, by using the display interface, different hard example types by using different display colors or different display lines.

In a possible implementation, the hard example mining module 1310 is configured to:

determine the plurality of hard examples in the unlabeled image set and the hard example attributes of the plurality of hard examples according to a hard example mining algorithm.

Figure 14:
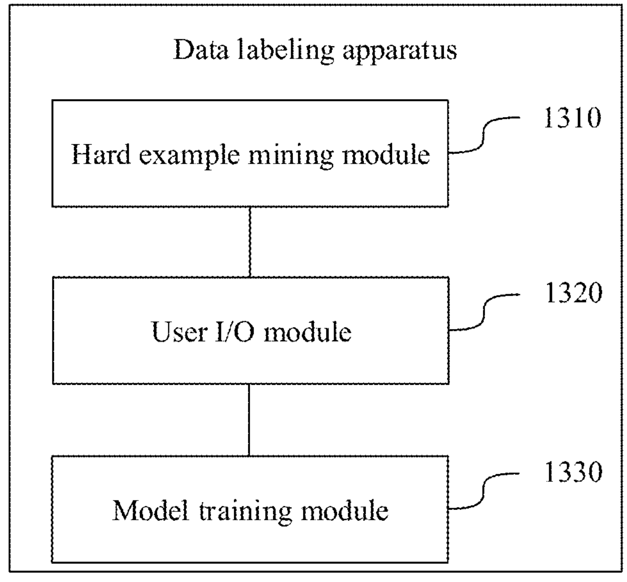
FIG. 14 is a schematic diagram of a structure of a data labeling apparatus according to an embodiment of this application.

In a possible implementation, as shown in FIG. 14, the apparatus further includes a model training module 1330, configured to:

obtain a weight for a hard example reason of each hard example in the at least one hard example after the labeling result obtained after the user confirms the at least one hard example in the display interface based on hard example coefficients of the plurality of hard examples is obtained;

analyze the labeling result, and if a target hard example in the at least one hard example is confirmed by the user as a correct hard example, increase the weight corresponding to the hard example reason of the target hard example; or if the target hard example is confirmed by the user as an incorrect hard example, decrease the weight corresponding to the hard example reason of the target hard example; and update the hard example mining algorithm based on updated weights.

In a possible implementation, the user I/O module 1320 is configured to:

obtain a hard example coefficient filtering range and/or display order selected by the user in the display interface; and display the at least one hard example and the corresponding hard example attribute by using the display interface based on the hard example coefficient filtering range and/or display order.

In a possible implementation, the user I/O module 1320 is further configured to:

when the at least one hard example is a plurality of hard examples, display, by using the display interface, statistical information corresponding to the unlabeled image set, where the statistical information includes one or more of distribution information of non-hard examples and hard examples in the unlabeled image set, hard example distribution information of various hard example reasons in the unlabeled image set, hard example distribution information of various hard example coefficient ranges in the unlabeled image set, and hard example distribution information of various hard example types in the unlabeled image set.

Optionally, the apparatus shown in FIG. 13 and FIG. 14 may be further configured to perform another action described in the embodiment of the foregoing data labeling method. Details are not described herein again.

It should be noted that, the apparatus shown in FIG. 13 and FIG. 14 may be a part of the AI platform shown in FIG. 1.

Figure 15:
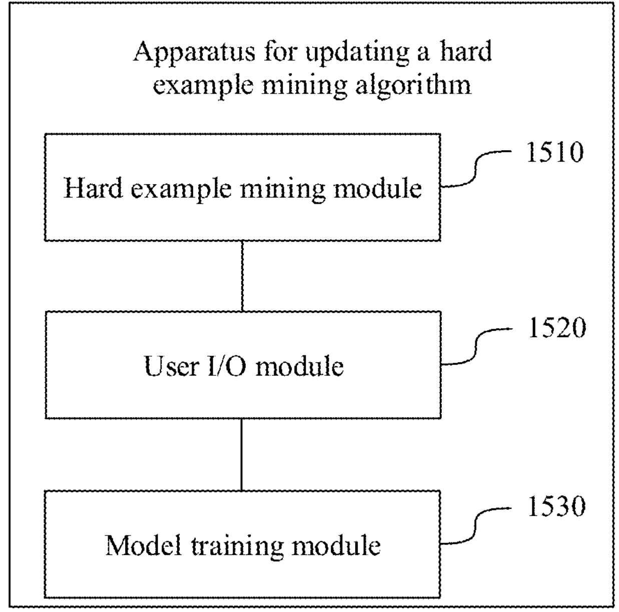
FIG. 15 is a schematic diagram of a structure of an apparatus for updating a hard example mining algorithm according to an embodiment of this application.

FIG. 15 is a diagram of a structure of a data labeling apparatus according to an embodiment of this application. The apparatus may be implemented as a part of the AI platform or the entire AI platform by using software, hardware, or a combination thereof. The data labeling apparatus provided in this embodiment of this application may implement the procedure shown in FIG. 12 of embodiments of this application. The apparatus includes a hard example mining module 1510, a user I/O module 1520, and a model training module 1530.

The hard example mining module 1510 is configured to determine a plurality of hard examples in an unlabeled image set by using a hard example mining algorithm, and the hard example mining module 1510 may be specifically configured to: implement the hard example mining function in step 1201 and perform an implicit step included in step 1201.

The user I/O module 1520 is configured to display at least one hard example in the plurality of hard examples to a user by using a display interface, and the user I/O module 1520 may be specifically configured to: implement the user I/O function in step 1202 and perform an implicit step included in step 1202.

The model training module 1530 is configured to update the hard example mining algorithm based on a labeling result obtained after the user confirms the at least one hard example by using the display interface, and the model training module 1530 may be specifically configured to: implement the model training function in step 1203 and perform an implicit step included in step 1203.

In a possible implementation, the hard example mining module 1510 is further configured to:

determine hard example reasons of the plurality of hard examples by using the hard example mining algorithm; and the user I/O module 1520 is further configured to provide suggestion information corresponding to the hard example reasons for the user by using the display interface, where the suggestion information indicates a processing manner that can be performed to reduce hard examples with corresponding hard example reasons.

In a possible implementation, the model training module 1530 is configured to:

obtain a weight for a hard example reason of each hard example in the at least one hard example;

analyze the labeling result, and if a target hard example in the at least one hard example is confirmed by the user as a correct hard example, increase the weight corresponding to the hard example reason of the target hard example; or if the target hard example is confirmed by the user as an incorrect hard example, decrease the weight corresponding to the hard example reason of the target hard example; and update the hard example mining algorithm based on updated weights.

In a possible implementation, the user I/O module 1520 is configured to:

display a hard example attribute corresponding to the at least one hard example by using the display interface, where the hard example attribute includes one or more of a hard example coefficient, a hard example reason, and a hard example type.

Optionally, the apparatus shown in FIG. 15 may be further configured to perform another action described in the embodiment of the foregoing method for updating a hard example mining algorithm. Details are not described herein again.

It should be noted that the apparatus shown in FIG. 15 may be a part of the AI platform shown in FIG. 1.

This application further provides a computing device 400 shown in FIG. 4. A processor 402 in the computing device 400 reads a program and an image set stored in a memory 401, to perform the foregoing method performed by the AI platform.

Figure 16:
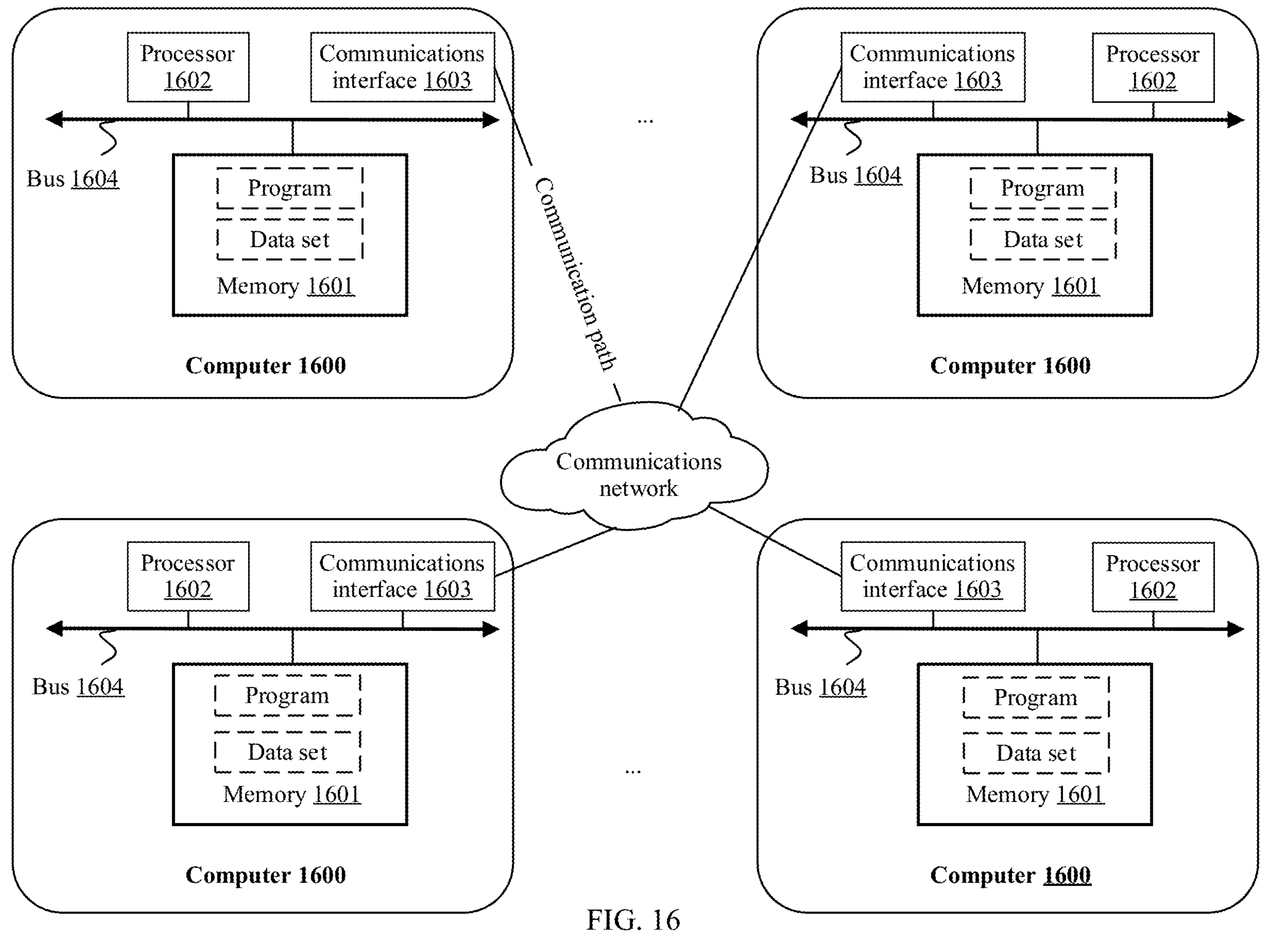
FIG. 16 is a schematic diagram of a structure of a computing device according to an embodiment of this application.

Because modules in the AI platform 100 provided in this application may be distributively deployed on a plurality of computers in a same environment or different environments, this application further provides a computing device shown in FIG. 16. The computing device includes a plurality of computers 1600. Each computer 1600 includes a memory 1601, a processor 1602, a communications interface 1603, and a bus 1604. The memory 1601, the processor 1602, and the communications interface 1603 implement a communication connection to each other by using the bus 1604.

The memory 1601 may be a read-only memory, a static storage device, a dynamic storage device, or a random access memory. The memory 1601 may store a program. When the program stored in the memory 1601 is executed by the processor 1602, the processor 1602 and the communications interface 1603 are configured to perform some of the methods used by the AI platform to obtain an AI model. The memory may further store an image set. For example, some storage resources in the memory 1601 are classified into an image set storage module, configured to store an image set required by the AI platform, and some storage resources in the memory 1601 are classified into an AI model storage module, configured to store an AI model library.

The processor 1602 may be a general-purpose central processing unit, a microprocessor, an application-specific integrated circuit, a graphics processing unit, or one or more integrated circuits.

The communications interface 1603 uses a transceiver module, for example without limitation to, a transceiver to implement communication between the computer 1600 and another device or a communications network. For example, an image set may be obtained by using the communications interface 1603.

The bus 1604 may include a path that transmits information between the components (for example, the memory 1601, the processor 1602, and the communications interface 1603) of the computer 1600.

A communication path is established between the computers 1600 by using a communications network. Each computer 1600 runs any one or more of a user I/O module 101, a hard example mining module 102, a model training module 103, an inference module 104, an AI model storage module 106, a data storage module 106, and a data preprocessing module 107. Any computer 1600 may be a computer (for example, a server) in a cloud data center, a computer in an edge data center, or a terminal computing device.

The description of the procedure corresponding to each accompanying drawing has its own emphasis. For parts that are not described in detail in a procedure, refer to the related description of another procedure.

All or some of the foregoing embodiments may be implemented by using software, hardware, or any combination thereof. When software is used to implement the embodiments, all or some of the embodiments may be implemented in a form of a computer program product. A computer program product that provides an AI platform includes one or more computer instructions entering the AI platform. When these computer program instructions are loaded and executed on a computer, the procedure or function shown in FIG. 5 in embodiments of this application is entirely or partially generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer-readable storage medium stores computer program instructions that provide an AI platform. The computer-readable storage medium may be any medium accessible by a computer, or a data storage device, such as a server or a data center, integrating one or more media. The medium may be a magnetic medium (for example, a floppy disk, a hard disk, or a magnetic tape), an optical medium (for example, an optical disc), or a semiconductor medium (for example, an SSD).

What is claimed is:

1. A data labeling method applied to a computing device, the method comprising:

determining, by hard example mining, a plurality of hard examples in an unlabeled image set and hard example attributes of the plurality of hard examples, wherein the plurality of hard examples and the hard example attributes are determined based on an inference result obtained by inputting the unlabeled image set to an initial artificial intelligence (AI) model or a trained AI model, and the hard example attribute comprises a hard example coefficient which reflects a hard example degree of the hard example, and the hard example degree is associated with a difficulty of obtaining a correct result by performing classification or detection by using the initial AI model or the trained AI model;

displaying at least one hard example in the plurality of hard examples and a corresponding hard example attribute to a user by using a display interface; and obtaining a labeling result obtained after the user confirms the at least one hard example in the display interface based on hard example coefficients of the plurality of hard examples;

wherein the hard example attribute further comprises a hard example reason; and wherein the displaying the at least one hard example in the plurality of hard examples and the corresponding hard example attribute by using the display interface further comprises:

displaying, by using the display interface, a hard example reason corresponding to the at least one hard example and suggestion information corresponding to the hard example reason, wherein the hard example reason includes a plurality of types, which are classified into data enhancement inconsistency, data feature distribution inconsistency, and the suggestion information indicates a processing manner to be performed to reduce hard examples with corresponding hard example reasons.

2. The method according to claim 1, wherein the hard example attribute further comprises a hard example type, and the hard example type comprises error detection, missed detection, or normal prediction.

3. The method according to claim 2, wherein the displaying the at least one hard example in the plurality of hard examples and the corresponding hard example attribute by using the display interface further comprises:

displaying, by using the display interface, different hard example types by using different display colors or different display lines.

4. The method according to claim 1, wherein the determining the plurality of hard examples in the unlabeled image set and the hard example attributes of the plurality of hard examples comprises:

determining the plurality of hard examples in the unlabeled image set and the hard example attributes of the plurality of hard examples according to a hard example mining algorithm.

5. The method according to claim 4, wherein after the obtaining the labeling result obtained after the user confirms the at least one hard example in the display interface based on the hard example coefficients of the plurality of hard examples, the method further comprises:

obtaining a weight for a hard example reason of each hard example in the at least one hard example;

analyzing the labeling result, and based on a target hard example in the at least one hard example being confirmed by the user as a correct hard example, increasing the weight corresponding to the hard example reason of the target hard example; or based on the target hard example being confirmed by the user as an incorrect hard example, decreasing the weight corresponding to the hard example reason of the target hard example; and updating the hard example mining algorithm based on updated weights.

6. The method according to claim 4, wherein the hard example mining algorithm comprises a plurality of algorithms, and wherein the determining the plurality of hard examples comprises: applying different weights to different algorithms among the plurality of algorithms to determine the hard examples and the hard example attributes, wherein the plurality of algorithms comprises two or more of a time sequence consistency algorithm, a data feature distribution algorithm, a data enhancement consistency algorithm, a non-deterministic algorithm, a clustering algorithm, and an anomaly detection algorithm.

7. The method according to claim 1, wherein the displaying the at least one hard example in the plurality of hard examples and the corresponding hard example attribute to the user by using the display interface comprises:

obtaining a hard example coefficient filtering range and/or display order selected by the user in the display interface; and displaying the at least one hard example and the corresponding hard example attribute by using the display interface based on the hard example coefficient filtering range and/or display order.

8. The method according to claim 1, further comprising:

based on the at least one hard example being a plurality of hard examples, displaying, by using the display interface, statistical information corresponding to the unlabeled image set, wherein the statistical information comprises one or more of:

distribution information of non-hard examples and hard examples in the unlabeled image set, hard example distribution information of various hard example reasons in the unlabeled image set, hard example distribution information of various hard example coefficient ranges in the unlabeled image set, and hard example distribution information of various hard example types in the unlabeled image set.

9. The method according to claim 1, further comprising: converting, based on the labeling result obtained after the user confirms the at least one hard example, a hard example set to be confirmed by the user into a labeled hard example set, a labeled non-hard example set, an unlabeled hard example set, or an unlabeled non-hard example set.

10. The method according to claim 1, further comprising: providing a hard example export interface for the user to select a save path, wherein the hard example export interface comprises a hard example attribute enable option; and based on the hard example attribute enable option being selected, exporting the corresponding hard example attribute together with the at least one hard example.

11. A method for updating a hard example mining algorithm, wherein the method is applied to a computer device and comprises:

determining a plurality of hard examples in an unlabeled image set by using the hard example mining algorithm; wherein the plurality of hard examples and hard example attributes are determined based on an inference result obtained by inputting the unlabeled image set to an initial artificial intelligence (AI) model or a trained AI model, displaying at least one hard example in the plurality of hard examples to a user by using a display interface; and updating the hard example mining algorithm based on a labeling result obtained after the user confirms the at least one hard example by using the display interface based on hard example coefficients of the plurality of hard examples, wherein a hard example coefficient reflects a hard example degree of the hard example, and the hard example degree is associated with a difficulty of obtaining a correct result by performing classification or detection by using the initial AI model or the trained AI model;

wherein the method further comprises:

determining hard example reasons of the plurality of hard examples by using the hard example mining algorithm, and providing suggestion information corresponding to the hard example reasons for the user by using the display interface, wherein the hard example reason includes a plurality of types, which are classified into data enhancement inconsistency, data feature distribution inconsistency, and wherein the suggestion information indicates a processing manner to be performed to reduce hard examples with corresponding hard example reasons.

12. The method according to claim 11, wherein the updating the hard example mining algorithm based on the labeling result obtained after the user confirms the at least one hard example by using the display interface comprises:

obtaining a weight for a hard example reason of each hard example in the at least one hard example;

analyzing the labeling result, and based on a target hard example in the at least one hard example being confirmed by the user as a correct hard example, increasing the weight corresponding to the hard example reason of the target hard example; or according to the labeling result, based on the target hard example being confirmed by the user as an incorrect hard example, decreasing the weight corresponding to the hard example reason of the target hard example; and updating the hard example mining algorithm based on updated weights.

13. The method according to claim 11, further comprising:

displaying a hard example attribute corresponding to the at least one hard example by using the display interface, wherein the hard example attribute comprises one or more of a hard example coefficient, a hard example reason, and a hard example type.

14. A computing device, comprising:

a memory and a processor, wherein the memory is configured to store a group of computer instructions; and the processor which is coupled to the memory executes the group of computer instructions to:

determine, by hard example mining, a plurality of hard examples in an unlabeled image set and hard example attributes of the plurality of hard examples, wherein the plurality of hard examples and the hard example attributes are determined based on an inference result obtained by inputting the unlabeled image set to an initial artificial intelligence (AI) model or a trained AI model, and the hard example attribute comprises a hard example coefficient which reflects a hard example degree of the hard example, and the hard example degree is associated with a difficulty of obtaining a correct result by performing classification or detection by using the initial AI model or the trained AI model;

display at least one hard example in the plurality of hard examples and a corresponding hard example attribute to a user by using a display interface; and obtain a labeling result obtained after the user confirms the at least one hard example in the display interface based on hard example coefficients of the plurality of hard examples;

wherein the hard example attribute further comprises a hard example reason; and wherein the displaying the at least one hard example in the plurality of hard examples and the corresponding hard example attribute by using the display interface further comprises:

displaying, by using the display interface, a hard example reason corresponding to the at least one hard example and suggestion information corresponding to the hard example reason, wherein the hard example reason includes a plurality of types, which are classified into data enhancement inconsistency, data feature distribution inconsistency, and the suggestion information indicates a processing manner to be performed to reduce hard examples with corresponding hard example reasons.

15. The computing device according to claim 14, wherein the hard example attribute further comprises a hard example type, and the hard example type comprises error detection, missed detection, or normal prediction.

16. The computing device according to claim 15, wherein the displaying the at least one hard example in the plurality of hard examples and the corresponding hard example attribute by using the display interface further comprises:

displaying, by using the display interface, different hard example types by using different display colors or different display lines.

17. The computing device according to claim 14, wherein the determining the plurality of hard examples in the unlabeled image set and the hard example attributes of the plurality of hard examples comprises:

determining the plurality of hard examples in the unlabeled image set and the hard example attributes of the plurality of hard examples according to a hard example mining algorithm.

18. The computing device according to claim 17, wherein after obtaining the labeling result obtained after the user confirms the at least one hard example in the display interface based on the hard example coefficients of the plurality of hard examples, the processor further executes the group of computer instructions to:

obtain a weight for a hard example reason of each hard example in the at least one hard example;

analyze the labeling result, and based on a target hard example in the at least one hard example being confirmed by the user as a correct hard example, increasing the weight corresponding to the hard example reason of the target hard example; or based on the target hard example being confirmed by the user as an incorrect hard example, decreasing the weight corresponding to the hard example reason of the target hard example; and updating the hard example mining algorithm based on updated weights.

19. The computing device according to claim 14, wherein the displaying the at least one hard example in the plurality of hard examples and the corresponding hard example attribute to the user by using the display interface comprises:

obtaining a hard example coefficient filtering range and/or display order selected by the user in the display interface; and displaying the at least one hard example and the corresponding hard example attribute by using the display interface based on the hard example coefficient filtering range and/or display order.

20. The computing device according to claim 14, wherein the processor further executes the group of computer instructions to:

based on the at least one hard example being a plurality of hard examples, display, by using the display interface, statistical information corresponding to the unlabeled image set, wherein the statistical information comprises one or more of:

distribution information of non-hard examples and hard examples in the unlabeled image set, hard example distribution information of various hard example reasons in the unlabeled image set, hard example distribution information of various hard example coefficient ranges in the unlabeled image set, and hard example distribution information of various hard example types in the unlabeled image set.

* * * * *